United States Patent
Starns

(10) Patent No.: US 10,670,411 B2
(45) Date of Patent: Jun. 2, 2020

(54) EFFICIENT MATCHING OF SERVICE PROVIDERS AND SERVICE REQUESTS ACROSS A FLEET OF AUTONOMOUS VEHICLES

(71) Applicant: Lyft, Inc., San Francisco, CA (US)

(72) Inventor: Alexander Thomas Starns, Menlo Park, CA (US)

(73) Assignee: Lyft Inc., San Francisco, CA (US)

(*) Notice: Subject to any disclaimer, the term of this patent is extended or adjusted under 35 U.S.C. 154(b) by 389 days.

(21) Appl. No.: 15/858,137

(22) Filed: Dec. 29, 2017

(65) Prior Publication Data

US 2019/0204097 A1   Jul. 4, 2019

(51) Int. Cl.
*G01C 21/00* (2006.01)
*G01C 21/34* (2006.01)
*G07C 5/08* (2006.01)
*G05D 1/00* (2006.01)
*G08G 1/00* (2006.01)
*G07C 5/00* (2006.01)
*G06Q 50/30* (2012.01)

(52) U.S. Cl.
CPC ....... *G01C 21/3453* (2013.01); *G05D 1/0088* (2013.01); *G07C 5/008* (2013.01); *G07C 5/0808* (2013.01); *G08G 1/20* (2013.01); *G05D 2201/0213* (2013.01); *G06Q 50/30* (2013.01)

(58) Field of Classification Search
CPC ...... G01C 21/3453; G08G 1/20; G07C 5/008; G07C 5/0808; G05D 1/0088; G05D 2201/0213; G06Q 50/30; G06Q 10/20; G06Q 10/02
See application file for complete search history.

(56) References Cited

U.S. PATENT DOCUMENTS

| | | | | |
|---|---|---|---|---|
| 7,650,229 B2 * | 1/2010 | Dorfstatter | ............. | G01C 21/26 455/345 |
| 8,190,322 B2 * | 5/2012 | Lin | ........................ | G07C 5/008 701/29.1 |
| 8,907,816 B2 * | 12/2014 | Ramseyer | .............. | G06Q 10/02 340/933 |
| 10,423,934 B1 * | 9/2019 | Zanghi | ........... | G06Q 10/063112 |
| 10,521,977 B2 * | 12/2019 | Pitt | ...................... | G01R 31/006 |

* cited by examiner

*Primary Examiner* — Ian Jen
(74) *Attorney, Agent, or Firm* — Baker Botts L.L.P.

(57) ABSTRACT

In one or more embodiments, one or more systems, methods, and/or processes may receive respective service center candidacy information from service center computers; determine that an autonomous vehicle requires service work; determine a pool of service centers that are capable of providing the service work for the autonomous vehicle; select, based at least on a reduction in a utilization of at least one resource, a service center from the pool of service centers; and provide, to the autonomous vehicle computing device associated with the autonomous vehicle, location information of the selected service center.

20 Claims, 14 Drawing Sheets

EFFICIENT MATCHING OF SERVICE PROVIDERS AND SERVICE REQUESTS ACROSS A FLEET OF AUTONOMOUS VEHICLES

BACKGROUND

An autonomous vehicle may be a transportation vehicle capable of driving and navigating based on data gathered by its sensors and the processing of such data by an onboard computing system. Unlike conventional, human-driven vehicles, an autonomous vehicle may need little or no input from a human driver to safely drive and navigate. However, like conventional vehicles, autonomous vehicles also need periodic maintenance and servicing, such as being refueled, cleaned, calibrated, or repaired.

DESCRIPTION OF EXAMPLE EMBODIMENTS

Figure 1A:
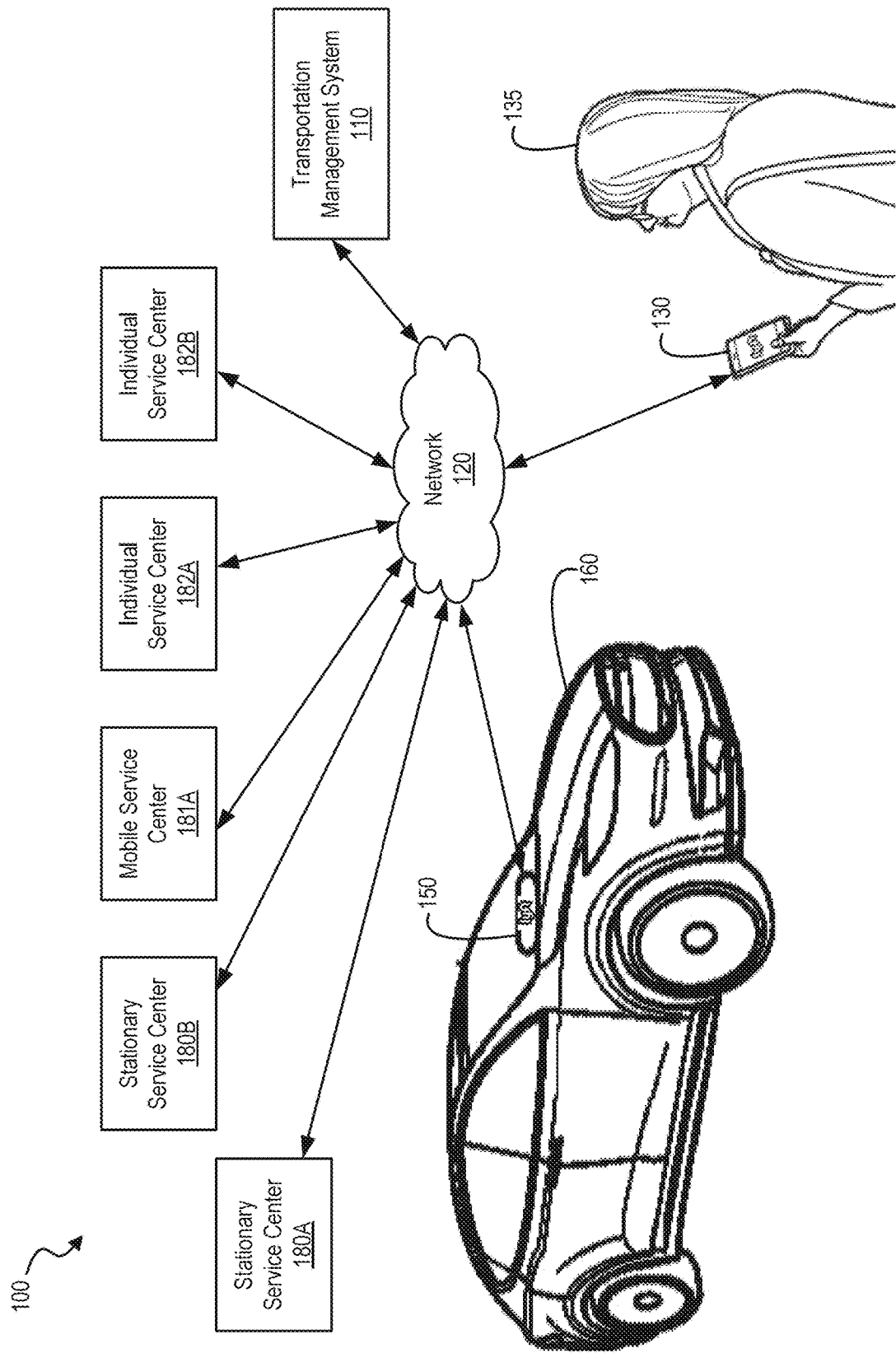
FIGS. 1A-1C illustrate examples of a transportation management environment, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Operating a successful transportation service using autonomous vehicles involves more than matching and dispatching the autonomous vehicles to fulfill ride requests from ride requestors. Beyond the hardware and software for matching rides, new technology is needed for autonomous vehicle management. For example, in a transportation service, such as a ridesharing transportation service in which ride providers (i.e., human drivers) drive their own vehicles, the ride providers are responsible for maintaining their own vehicles. On the other hand, a transportation service that also uses autonomous vehicles to fulfill ride requests is responsible for ensuring that the autonomous vehicles are kept in good working order and that the autonomous vehicles meet applicable safety and regulatory requirements. Like conventional human-driven vehicles, autonomous vehicles also need maintenance from time-to-time. In one example, the need for maintenance may be associated with one or more issues and/or problems. For instance, the one or more issues and/or problems may include one or more of a failed sensor, a malfunctioning sensor, a burned out headlight, a burned out taillight, a burned out turn signal light, a burned out cabin light, low tire pressure, a clog or an obstruction in a cabin air distribution system, a blown fuse, a broken window or windshield, a broken or failing air conditioning system, an oil leak, a fuel leak, a coolant leak, low oil pressure, and a low level of coolant, among others. In a second example, the maintenance may be preventative maintenance. For instance, the preventative maintenance may include one or more of tire replacement, adding air to one or more tires, air filter replacement, adding coolant, adding oil, an oil change, and one or more firmware updates and/or software updates, among others. In another example, the maintenance may be associated with cleaning the autonomous vehicles and/or inspecting the autonomous vehicles. In one instance, cleaning an autonomous vehicle may include one or more of washing the outside of the autonomous vehicle, vacuuming the inside of the autonomous vehicle, and washing the insides of the windows of the autonomous vehicle, among others. In another instance, inspecting an autonomous vehicle may include one or more of viewing the exterior of the autonomous vehicle for damage (e.g., dents, dings, hail damage, rock damage, scratches, scrapes, etc.), viewing the interior of the autonomous vehicle for damage (e.g., scratches, scrapes, tearing of a seat, tearing of a carpet, etc.), viewing the tires on the autonomous vehicle for wear, looking for trash left in the autonomous vehicle, and looking for liquid spills (e.g., soda spills, coffee spills, etc.), among others.

Despite the certainty or near certainty that autonomous vehicles would need to be serviced periodically, autonomous vehicles are not configured to handle their own service/maintenance scheduling. Furthermore, when an autonomous vehicle is part of a fleet of autonomous vehicles operated by a transportation service, the time at which the vehicle is temporarily taken offline to be serviced (e.g., out of the available pool of vehicles that may be dispatched to fulfill ride requests) and the duration of the offline period would affect the overall operation of the fleet, especially when ride demand is high. An autonomous vehicle, however, is not configured to take such fleet-level impact into consideration.

In particular embodiments, a transportation management system that manages a fleet of autonomous vehicles for servicing ride requests may also manage the vehicles' maintenance. For example, the transportation management system may schedule autonomous vehicles for service during periods of predicted low demand and/or based at least on the urgency of addressing the needed services. In particular embodiments, a subset of needed services may be performed during a short window of predicted low demand or during a period of high or peak demand if, for example, a vehicle does not meet minimum maintenance requirements for being included in a pool of autonomous vehicles available to fulfill ride requests. When scheduling autonomous vehicles for service, a transportation management system may also take into consideration the capabilities, available capacity, speed of operations, and/or locations of various service centers.

In particular embodiments, a transportation service provider associated with a transportation management system may operate service centers that are accessible from a region. Operating such facilities, however, may be expensive and cost-prohibitive, as it requires real estate, equipment, and service technicians. This may especially true for highly populated areas, such as cities, where real estate is scarce. While it may be possible to have facilities outside of but accessible from highly populated areas, servicing autonomous vehicles at such locations may mean increased offline durations, for vehicles, since the vehicles would have to drive outside to the service centers and then drive back to the area where demand is high. This in turn would negatively impact the vehicle's utilization and the service capacity of the fleet overall.

To address these problems and others, particular embodiments described herein relate to systems and methods that match autonomous vehicles needing service with existing third-party service providers. Since third-party service providers (e.g., automobile service and repair facilities) already exist in most regions to service conventional human-driven vehicles, the transportation management system may leverage their expertise, equipment, personnel, and locations. Not only would doing so decrease a transportation management system's barrier-to-entry into a particular region, it would also expand the network of service providers available to the autonomous vehicles so that they may be serviced near their current location. Without having to spend time commuting to and from distant service providers, autonomous vehicle would be more fully utilized (due to less time being offline) and the fleet as a whole would be better suited to satisfy ridership demands. In addition, the increased service capacity offered by the network of service providers would also help decrease wait time for service.

The embodiments described herein that enable third-party service providers to be matched with autonomous vehicles also benefit the third-party service providers. Third-party service providers, such as existing automobile maintenance and repair facilities, may often be operating at less than full capacity, especially during certain non-peak hours (e.g., night time, weekdays, etc.). In addition, individuals who may be experienced with or trained to service vehicles may also have excess capacity and desire to put their skills to use. Embodiments described herein would enable these willing third-party service providers (whether third-party individuals or maintenance and repair facilities) to make use of their excess bandwidth, and at the same time help meet the service needs of the fleet of autonomous vehicles.

Since a transportation management system may be deployed in a variety of environments, particular embodiments described herein further relates to systems and methods for matching autonomous vehicles with service providers in a robust manner. As previously described, service providers may include internal service providers operated by the transportation service, third-party repair and maintenance facilities, and third-party individuals. Not only may there be different types of service providers, service providers of the same type may also have different characteristics, which may be related to, e.g., location, maximum capacity, available capacity, services offered, service or operational costs (labor, parts, storage, real estate), inventory, nearby traffic patterns, disruption risk, environmental factors, among others. Furthermore, a transportation service may be deployed or expand into regions with different geographic characteristics, such as different traffic patterns, ride demand patterns, population density, and/or transportation infrastructure, among others. Moreover, the fleet of vehicles servicing a particular region may have unique characteristics, such as fleet size and vehicle characteristics, including, e.g., maximum driving range before refueling, maximum speed, weather tolerance, day and night driving abilities, current condition, and/or maintenance needs, among others. Since characteristics of the available pool of service providers may be diverse, the systems and methods for matching autonomous vehicles with the service providers would need to be robust to avoid needing to have custom systems and methods tailored for each service region.

Particular embodiments of a matching process may take into account a variety of factors when determining how to match an autonomous vehicle with a service provider. In one example, a matching process may take into account distance between a service provider and an autonomous vehicle, or an estimated amount of fuel (whether gasoline or battery charge) needed for an autonomous vehicle to reach a service provider. In another example, the matching process may additionally or alternatively take into consideration whether a service provider is a third-party relative to the transportation service system, and/or whether a service provide has capacity or is likely to complete the needed service within a threshold timeframe. Further embodiments and examples are described in further detail below.

Utilizing various information from service providers and/or from historic data, a transportation management system may match autonomous vehicles with service providers, which may provide various benefits and/or advantages. In one example, matching autonomous vehicles with service providers may maximize availability of autonomous vehicles to ride requesters. For instance, people who need transportation or cannot otherwise drive a vehicle may benefit from having autonomous vehicles available when needed. In a second example, matching autonomous vehicles with service providers may minimize fuel and/or energy consumption. In one instance, an autonomous vehicle may be matched to a first service center that is closer to the autonomous vehicle than a second service center. In a second instance, autonomous vehicles may be operating in a remote region, and the autonomous vehicles may be matched to a service provider that operates a mobile service center, which may be driven to a location suitable for the autonomous vehicles operating in the remote region. In another example, basing a match, at least on historical data, to a first service provider, riders may benefit from a track record of the first service provider that is better than a track record of a second service provider. In one instance, the historical data may indicate that service work from the first service provider has fewer recalls than service work from the second service provider. In second instance, the historical data may indicate that parts used by for service work from the first service provider are more robust than parts used by for service work from the second service provider. In another instance, the historical data may indicate that the first service provider has a better quality control for service work than the second service provider.

Turning now to the Figures, FIG. 1A illustrates an example of a transportation management environment 100, according to one or more embodiments. As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

As shown, a transportation management system 110 may be communicatively coupled to a network 120. In particular embodiments, transportation management system 110 may include one or more computer systems and/or one or more databases, among others. For example, one or more of the one or more computer systems and/or the one or more databases may be distributed across and/or throughout a geographic region of any size. In particular embodiments, transportation management system 110 may receive a request for transportation from a computing device 130 of a ride requestor 135. In response to receiving the request, transportation management system 110 may provide a message to a computing device 150 of an autonomous vehicle 160. In one example, the message may include one or more of a pickup location (e.g., a first address, first latitude/longitude coordinates, etc.), turn-by-turn directions to the pickup location, and/or other information. In another example, the message may include one or more of a destination location (e.g., a second address, second latitude/longitude coordinates, etc.), turn-by-turn directions to the destination location, and/or other information. For instance, the destination location may be or include a drop-off location. In particular embodiments, the request for transportation may include multiple destinations. For example, ride requestor 135 may request transportation to various locations. For instance, ride requestor 135 may be running errands (e.g., two or more of a banking errand, a lunch errand, a post office errand, a pet grooming errand, a pharmacy errand, etc.). In particular embodiments, computing device 130 and computing device 150 may be coupled to network 120. For example, network 120 may include one or more of a wired network, an optical network, and a wireless network, among others, described further below.

In particular embodiments, transportation management environment 100 may include various ride requestors 135 and various autonomous vehicles 160, and transportation management system 110 may match ride requestors 135 with autonomous vehicles 160 and may maximize availability of autonomous vehicles 160. For example, transportation management environment 100 may maximize availability of autonomous vehicles 160 by generating logistics and/or coordinating service work of autonomous vehicles 160, described further below.

As shown, fleet management environment 100 may include transportation management system 110 and one or more service centers 180, 181, and/or 182 at which autonomous vehicles 160 may be serviced. In particular embodiments, one or more service centers 180, 181, and/or 182 may be owned and/or operated by one or more service providers. In one example, a first service provider may own and/or operate a first stationary service center 180. In a second example, a second service provider may own and/or operate a second stationary service center 180.

In particular embodiments, a service provider may be or include an owner and/or operator of autonomous vehicles 160. For example, the owner and/or operator of autonomous vehicles 160 provide various service centers 180 and/or 181 to provide service work to autonomous vehicles 160. For instance, the owner and/or operator of autonomous vehicles 160 provide stationary service center 180A and/or mobile service center 181A to provide service work to autonomous vehicles 160. In particular embodiments, service provider may be or include a corporation (e.g., a third-party) that may not be directly associated with an owner and/or operator of autonomous vehicles 160 but may provide service work to autonomous vehicles 160 via one or more service centers 180 and/or 181 that are owned and/or operated by the corporation. For example, one or more of stationary service center 180B and/or mobile service center 181B may be owned and/or operated by the corporation, which may provide service work to autonomous vehicles 160. For instance, one or more of stationary service center 180B and/or mobile service center 181B may be third-party service centers.

In particular embodiments, a service provider may be an individual (e.g., a third-party). In one example, an individual service center 182A may be or include a garage or a driveway of the individual, where the individual may provide service work for one or more autonomous vehicles 160. In another example, an individual service center 182B may be or include a vehicle of the individual, where the individual may travel to various locations to provide service work for one or more autonomous vehicles 160. In particular embodiments, an individual service center 182 may be a third-party service center.

As illustrated, one or more service centers 180, 181, and/or 182 may be coupled to network 120. In particular embodiments, one or more service centers 180, 181, and/or 182 and transportation management system 110 may communicate and/or exchange information via network 120. For example, one or more service centers 180, 181, and/or 182 may respectively include one or more computing devices that may communicate and/or exchange information via network 120.

In particular embodiments, one or more service centers 180, 181, and/or 182 may request an autonomous vehicle 160. For example, one or more service centers 180, 181, and/or 182 may include a gas station, charging station, a parking facility, a cleaning facility, and/or a maintenance facility, which may send a notification, via network 120, to transportation management system 110 to indicate an availability at a respective service center. For instance, one or more service centers 180, 181, and/or 182 may notify transportation management system 110 of available capacity to service vehicles. In particular embodiments, transportation management system 110 may then match autonomous vehicles 160 for service, as such autonomous vehicles that require service and/or maintenance. For example, transportation management system 110 may receive data from a vehicle sensor in an autonomous vehicle 160 indicating that autonomous vehicle 160 requires service and/or maintenance. For instance, sensors (e.g., weight sensors, moisture sensors, etc.), and/or in-vehicle cameras, and/or feedback submitted by a user (e.g., a rider, passenger, etc.) may be used to dispatch a vehicle to a service center, which may be capable of performing different cleaning services (e.g., wet cleans, dry cleans, etc.). In particular embodiments, transportation management system 110 may then match autonomous vehicle 160 to a service center of one or more of service centers 180, 181, and/or 182, which indicated available space and may perform appropriate service and/or maintenance for autonomous vehicle 160.

Figure 1B:
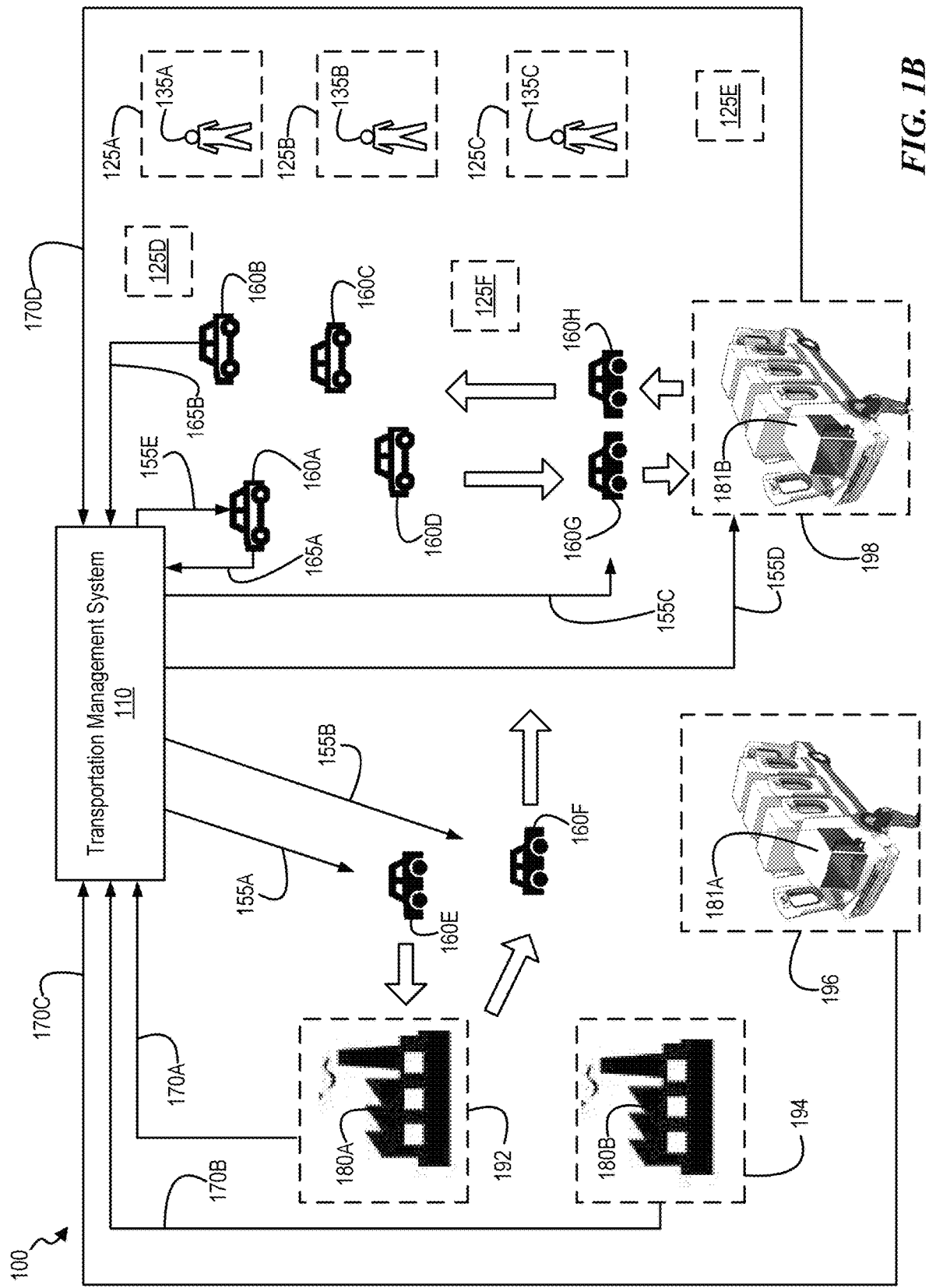

Turning now to FIG. 1B, another example diagram of transportation management environment 100 is illustrated, according to one or more embodiments. At any given point in time, autonomous vehicles 160 may include a pool of autonomous vehicles (e.g., 160A-160D) available to fulfill ride requests of ride requestors 135, and may also include one or more autonomous vehicles (e.g., 160E-160H) that are not available to fulfill ride requests. Autonomous vehicles that are unavailable may include those that are scheduled for and/or receiving service work at a service center 180 and/or at a mobile service center 181. For example, autonomous vehicles 160 may fulfill ride requests of ride requestors 135A-135C, at respective locations 125A-125C (e.g., pickup locations), by transporting ride requestors 135A-135C to one or more destination locations 125D-125F (e.g., drop-off locations). For instance, transportation management system 110 may determine a prediction of demand for autonomous vehicles 160 in a fleet of autonomous vehicles based at least on data representing current conditions and future events and may schedule an autonomous vehicle 160 for service work at one or more service centers 180 and/or 181 based on the prediction, among other factors. Transportation management system 110 may send instructions 155 to an autonomous vehicle 160 causing autonomous vehicle 160 to drive to a service center 180 or 181, where the scheduled service work is to be performed.

In one example, transportation management system 110 may have determined that autonomous vehicle 160E should be scheduled for one or more services at stationary service center 180A. For instance, transportation management system 110 may have matched autonomous vehicle 160E with stationary service center 180A. In response to this determination, transportation management system 110 may provide instructions 155A to autonomous vehicle 160E to drive (or return) to service center 180A for service work. In accordance with instructions 155A, autonomous vehicle 160E may be removed from the pool of autonomous vehicles available to fulfill ride requests, a condition that may also be referred to as being taken "offline", and may drive to service center 180A for service work. After an autonomous vehicle (e.g., 160F) has been serviced by a stationary service center 180, it may return to the pool of available autonomous vehicles.

In another example, transportation management system 110 may have determined that autonomous vehicle 160G should be scheduled for one or more services at mobile service center 181B. For instance, transportation management system 110 may have matched autonomous vehicle 160G with mobile service center 181B. In response to this determination, transportation management system 110 may provide instructions 155C to autonomous vehicle 160G to drive (or return) to service center 181B for service work. In accordance with instructions 155C, autonomous vehicle 160G may be removed from the pool of autonomous vehicles available to fulfill ride requests, a condition that may also be referred to as being taken "offline", and may drive to service center 181B for service work. In some cases, autonomous vehicle 160G may arrive at location 198 before mobile service center 181B arrives at location 198. In other cases, mobile service center 181B may arrive at location 198 before autonomous vehicle 160G arrive at location 198. After an autonomous vehicle (e.g., 160H) has been serviced by a mobile service center 181, it may return to the pool of available autonomous vehicles.

In particular embodiments, transportation management system 110 may match autonomous vehicle 160G with mobile service center 181B, rather than stationary service center 180B. For example, some autonomous vehicles may be deployed in areas that may be considered remote from one or more stationary service centers 180, and transportation management system 110 may provide instructions to some autonomous vehicles to travel to a location 196 or 188 to be serviced by a respective mobile service center 181A or 181B.

In particular embodiments, transportation management system 110 may provide instructions 155D to mobile service center 181B. In one example, instructions 155D may instruct a driver of mobile service center 181B to drive mobile service center 181B to location 198. In another example, mobile service center 181B may be an autonomous vehicle, which may utilize instructions 155D to navigate to location 198. In one instance, instructions 155D may include coordinates of location 198. In another instance, instructions 155D may include turn-by-turn instructions to navigate mobile service center 181B to location 198.

In particular embodiments, autonomous vehicles 160F and 160H may return to a pool of autonomous vehicles available to fulfill ride requests. For example, transportation management system 110 may provide instructions 155B to autonomous vehicle 160F to drive to a location (e.g., a location of locations 125D-125F, among others), at which point autonomous vehicle 160F may be returned to the pool of autonomous vehicles available to fulfill ride requests.

In particular embodiments, if an autonomous vehicle 160, that is providing a transportation service to one or more passengers, detects a system malfunction, transportation management system 110 may respond by arranging alternative transportation for the one or more passengers and guiding the impaired autonomous vehicle to a service center. For example, autonomous vehicle 160B may be providing a transportation service to one or more passengers and a system malfunction may be detected. In one instance, autonomous vehicle 160B may detect the system malfunction. In another instance, transportation management system 110 may detect the system malfunction.

In particular embodiments, detecting a system malfunction may include receiving data from a sensor of autonomous vehicle 160. For example, autonomous vehicle computing device 150 and/or transportation management system 110 may receive that data from the sensor of autonomous vehicle 160 and/or may detect the system malfunction. In one instance, if a comparison of the data with one or more metrics exceeds a threshold, autonomous vehicle computing device 150 and/or transportation management system 110 may determine that there is the system malfunction. In another example, if a comparison of the data with one or more metrics falls below a threshold, device 150 and/or transportation management system 110 may determine that there is the system malfunction. In particular embodiments, detecting a system malfunction may include determining that data from a sensor of autonomous vehicle 160 has not been received within an amount of time. For example, if autonomous vehicle computing device 150 and/or transportation management system 110 does not receive data from the sensor of autonomous vehicle 160 within the amount of time, autonomous vehicle computing device 150 and/or transportation management system 110 may determine that there is the system malfunction.

Figure 1C:
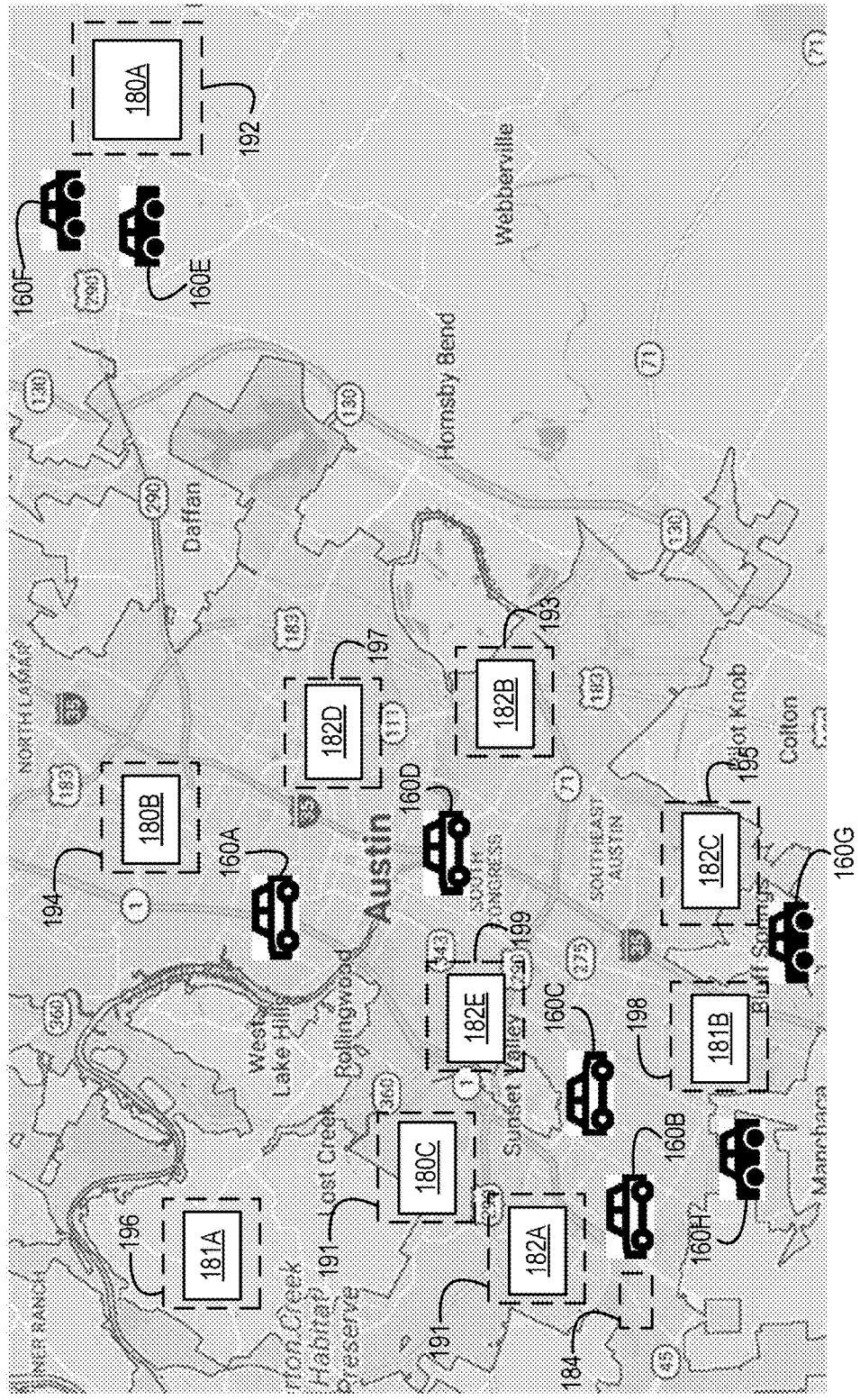

In particular embodiments, if autonomous vehicle computing device 150 detects a system malfunction with its autonomous vehicle 160, autonomous vehicle computing device 150 may notify transportation management system 110. For example, autonomous vehicle computing device 150 may provide information that a malfunction has been detected and/or information associated with a detected malfunction to transportation management system 110 via network 120. In particular embodiments, if transportation management system 110 determines or receives information that autonomous vehicle 160 is experiencing a service related issue, such as a system malfunction, while autonomous vehicle 160 is providing a transportation service to one or more passengers, transportation management system 110 may provide commands and/or instructions to autonomous vehicle 160, which may cause autonomous vehicle 160 may navigate to a safe area and/or location. For example, autonomous vehicle 160B may be experiencing a service related issue, and transportation management system 110 may provide commands and/or instructions to autonomous vehicle 160B, which may cause autonomous vehicle 160B may navigate to a safe area and/or location 194, as illustrated in FIG. 1C. For instance, safe area and/or location 194 may be or include a parking lot, a shoulder of a road, etc.

In particular embodiments, the owner/operator of the fleet of autonomous vehicles may utilize one or more third-party service centers from the pool of service centers. For example, utilizing a third-party service center may reduce utilization of one or more resources (e.g., energy resources, time resources, cost resources, etc.) in servicing one or more autonomous vehicles of the fleets of autonomous vehicles. For instance, the owner/operator of the fleet of autonomous vehicles may own and/or operate service center 180A and may utilize a third-party service center (e.g., 180B, 181B, 182A, 182D, 182B, 182C, 182E, etc.) to reduce utilization of one or more resources (e.g., energy resources, time resources, cost resources, etc.) in servicing one or more autonomous vehicles 160A-160D, among others. As shown, for example, service center 180A may be located in a remote area and/or region compared to an area and/or region where autonomous vehicles 160A-160D are operating.

In particular embodiments, after determining or receiving information that autonomous vehicle 160 is experiencing a service related issue, such as a system malfunction, while autonomous vehicle 160 is providing a transportation service to one or more passengers, transportation management system 110 may direct, instruct, and/or navigate another autonomous vehicle 160 to a location at least proximate to the location of autonomous vehicle 160 that is experiencing the service related issue, so that the one or more passengers may utilize the other autonomous vehicle 160 to arrive at a destination associated with the one or more passengers (e.g., a drop-off location). For example, transportation management system 110 may direct, instruct, and/or navigate autonomous vehicle 160C to a location at least proximate to safe area and/or location 194, so that the one or more passengers may utilize autonomous vehicle 160C to arrive at a destination associated with the one or more passengers (e.g., a drop-off location, such as location 125D, 125E, 125F, etc.).

In particular embodiments, transportation management system 110 may determine and/or compute a route to a location when autonomous vehicle 160 suffers a malfunction and/or failure. In one example, autonomous vehicle 160 may experience a sensor failure. For instance, transportation management system 110 may determine and/or compute a route to a location (e.g., a location of a service center, such as location 191, 192, 193, 194, 195, 196, 197, 198, 199, etc.) based at least on information associated with the sensor failure. In another example, autonomous vehicle 160 may experience a sensor malfunction. For instance, the sensor malfunction may be associated with dirt and/or grime that has accumulated on and/or within a sensor, and transportation management system 110 may determine and/or compute a route to a location (e.g., a location of a service center, such as location 191, 192, 193, 194, 195, 196, 197, 198, 199, etc.) based at least on information associated with the sensor malfunction (e.g., a facility that is configured to clean dirt or grime off the associated sensor). In particular embodiments, determining and/or computing a route to a location when autonomous vehicle 160 suffers a malfunction and/or failure may include determining and/or computing a limit of speed and/or a type of road that may be safely navigated based on information associated with the malfunction and/or failure. For example, an accuracy of a computer vision system of autonomous vehicle 160 may be affected, and a limit of speed and/or a type of road that may be safely navigated may be determined and/or computed based on information associated with the accuracy of the computer vision system of autonomous vehicle 160.

Figure 2A:
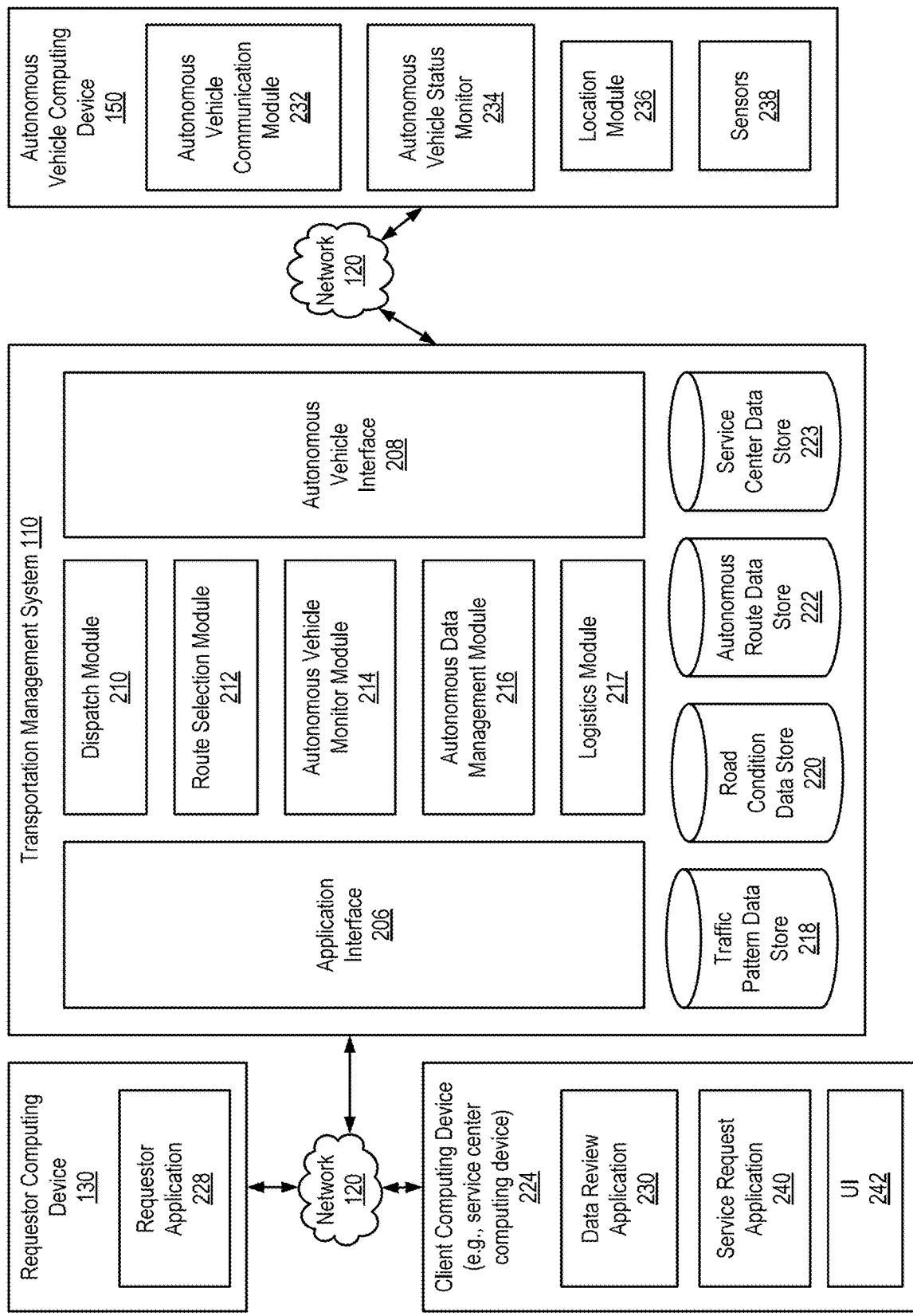
FIG. 2A illustrates examples of various systems, according to one or more embodiments.

Turning now to FIG. 2A, examples of various systems are illustrated, according to one or more embodiments. As shown, transportation management system 110 may include an application interface 206, an autonomous vehicle interface 208, a dispatch module 210, a route selection module 212, an autonomous vehicle monitor module 214, an autonomous data management module 216, and a logistics module 217. In particular embodiments, transportation management system 110 may include one or more data stores. In one example, a data store may include one or more databases. In another example, a database may include one or more data stores. As illustrated, transportation management system 110 may include a traffic pattern data store 218, a road condition data store 220, an autonomous route data store 222, and facility data store 223. In particular embodiments, information stored by one or more of data stores may be utilized by any of modules 210-217 in performing one or more corresponding functionalities. Although transportation management system 110 is illustrated in a single element, transportation management system 110 may be hosted and/or implemented by multiple computer systems and/or distributed across multiple computer systems, according to particular embodiments. In one example, two or more of modules 210-217 may be performed and/or implemented by two or more computer systems. In another example, two or more of modules 210-217 may be separated into two or more services and/or over two or more computer systems to perform functionalities described herein.

In particular embodiments, transportation management system 110 may communicate with one or more requestor computing devices 130, one or more client computing devices 224, one or more autonomous vehicle computing devices 150, and/or one or more other computing devices. As illustrated, transportation management system 110 may communicate with one or more requestor computing devices 130, one or more client computing devices 224, and one or more autonomous vehicle computing devices 150 by network 120. In particular embodiments, network 120 may include one or more of a wireless network, a wired network, and an optical network, among others. For example, network 120 may include one or more of a wide area network (WAN), a private WAN, a local area network (LAN), a wireless LAN (WLAN), a public switched telephone network (PSTN), a metropolitan area network (MAN), a public WAN (e.g., an Internet), a satellite telephone network, a cellular telephone network, and a virtual private network (VPN), among others. In particular embodiments, network 120 may be coupled to one or more other networks. For example, network 120 may be coupled to one or more of a WAN, a WLAN, a PSTN, LAN, a MAN, a public WAN, a private WAN, a cellular telephone network, a satellite telephone network, and a VPN, among others.

In particular embodiments, application interface 206 may include any software and/or hardware configured to send and receive communications and/or other information between transportation management system 110 and requestor computing devices 130 and/or client computing device 224. For example, application interface 206 may be configured to facilitate communication transportation management system 110 and a requestor application 228 operating on a requestor computing device 130, which may be used by a ride requestor 135 to request the transportation management system 110 for a ride. The application interface 206 may also communicate with a data review application 230 operating on a client computing device 224 of a service center, among others. For instance, application interface 206 may receive ride requests, location information, a request location (also referred to as a "pick-up" location, such as location 125A), a drop-off location (such as location 125E), a ride type, and/or any other relevant information from requestor computing device 130 executing requestor application 228.

In particular embodiments, a ride request may include a requestor identifier, location information (e.g., an address, latitude and longitude coordinates, etc.) for requestor computing device 130, a pick-up location for the ride request, one or more drop-off locations, a pick-up time, and/or any other suitable information associated with providing a transportation service to a requestor (e.g., a requestor 135). In particular embodiments, requestor computing device 130 may be, represent, or include a personal computing device of a user (e.g., a ride requestor 135). For example, requestor computing device 130 may utilized to request a ride service from transportation management system 110. In particular embodiments, a ride request may be sent in a single message or may include a series of messages. For example, application interface 206 may receive the ride request and provide ride match messages, autonomous vehicle location information, travel routes, pick-up estimates, traffic information, requests for autonomous ride instructions, autonomous vehicle status information, updates/notifications, and/or any other relevant information to requestor application 228. For instance, requestor application 228 may receive the messages from application interface 206 and provide one or more of visual, audio, and haptic output based at least on the messages from application interface 206.

In particular embodiments, requestor application 228 may be configured to display, to the requestor (e.g., requestor 135), one or more available routes between the requestor's pickup location and drop-off location. The requestor may select one of the one or more available routes, causing a message indicating the selected route to be sent to transportation management system 110. In particular embodiments, based at least on the selected route, dispatch module 210 may dispatch an autonomous vehicle to the pickup location with an instruction to follow the selected route. Route selection module 212 may then update autonomous route data store 222 to indicate when the route was last travelled by an autonomous vehicle 160.

In particular embodiments, autonomous vehicle computing device 150 may be or include a computing device integrated with an autonomous vehicle (e.g., autonomous vehicle 160), such as an in-vehicle computing device configured to control the autonomous vehicle. In particular embodiments, autonomous vehicle computing device 150 may be a separate communications device configured to facilitate communication between transportation management system 110 and the autonomous vehicle.

In particular embodiments, autonomous vehicle interface 208 may include any software and/or hardware configured to send and receive communications and/or other information between transportation management system 110 and autonomous vehicle computing devices 150. In one example, autonomous vehicle interface 208 may be configured to receive location information, vehicle and/or ride status information, autonomous vehicle status, and/or any other relevant information from autonomous vehicle computing device 150. In another example, autonomous vehicle interface 208 may be configured to send ride requests, requestor location information, pick-up location information, travel routes, pick-up estimates, traffic information, provider updates/notifications, autonomous vehicle operating instructions, autonomous vehicle data, autonomous vehicle sensor data, and/or any other relevant information to the autonomous vehicle computing device 150. In particular embodiments, autonomous vehicle computing device 150 may be an in-vehicle computing device, such as any computing device that is configured to communicate with transportation management system 110 and/or requestor computing device 130 over one or more communication networks.

For example, autonomous vehicle computing device 150 may include an autonomous vehicle communication module 232 that is configured to manage communications with transportation management system 110 and/or other autonomous vehicle computing devices. In particular embodiments, autonomous vehicle communication module 232 may provide vehicle, location, and travel data to transportation management system 110. In particular embodiments, autonomous vehicle computing device 150 may communicate directly with other nearby autonomous vehicle computing devices 150 to share location data and/or travel data.

In particular embodiments, travel data may be collected by autonomous vehicle status monitor 234. For example, autonomous vehicle status monitor 234 may record information associated with utilization of an autonomous vehicle. For instance, vehicle status monitor 234 may record one or more of a number of rides completed by the autonomous vehicle, a number of miles traveled, a time elapsed, and other travel information since the autonomous vehicle last received maintenance. In particular embodiments, vehicle maintenance codes, such as codes associated with a check engine light, oil pressure, oil level, fuel level, etc. may also be recorded by autonomous vehicle status monitor 234. For example, autonomous vehicle information may be collected from the autonomous vehicle itself (e.g., by a controller area network bus) or from application programming interfaces provided by a vehicle manufacturer, which may send data directly to an in-car console and/or to transportation management system 110.

In particular embodiments, location module 236 may implement a global positioning system (GPS) receiver device, cellular communications triangulation, and/or any other suitable location-based techniques to determine coordinates or locations of device autonomous vehicle computing device 150. In particular embodiments, autonomous vehicle computing device 150 may request service work based on data recorded by vehicle status monitor 234. For example, a request for service work may be sent to transportation management system 110. For instance, transportation management system 110 may determine a service center (e.g., a service center 180, a service center 181, or a service center 182) to provide service work for the autonomous vehicle.

In particular embodiments, autonomous vehicle computing device 150 may determine and/or compute a route to a location when its autonomous vehicle 160 suffers a malfunction and/or failure. In one example, autonomous vehicle 160 may experience a sensor failure. For instance, autonomous vehicle computing device 150 may determine and/or compute a route to a location based at least on information associated with the sensor failure. In another example, autonomous vehicle 160 may experience a sensor malfunction. For instance, the sensor malfunction may be associated with dirt and/or grime that has accumulated on and/or within a sensor, and autonomous vehicle computing device 150 may determine and/or compute a route to a location based at least on information associated with the sensor malfunction. In particular embodiments, determining and/or computing a route to a location when autonomous vehicle 160 suffers a malfunction and/or failure may include determining and/or computing a limit of speed and/or a type of road that may be safely navigated based on information associated with the malfunction and/or failure. For example, an accuracy of a computer vision system of autonomous vehicle 160 may be affected, and a limit of speed and/or a type of road that may be safely navigated may be determined and/or computed based on information associated with the accuracy of the computer vision system of autonomous vehicle 160.

In particular embodiments, a service provider may utilize a client computing device 224 to sign-up to provide service to autonomous vehicles. For example, a service provider or a representative of a service provider may utilize an application (APP) to sign-up to provide service to autonomous vehicles. For instance, utilizing the APP, the service provider or the representative of a service provider may indicate one or more of a capacity (e.g., per thirty minute slots), service status, and compensation (e.g., pricing) for service work, among others. As illustrated, client computing device 224 may include a service request application 240. For example, service request application 240 may notify transportation management system 110 of availability, service type(s), etc. For instance, a service center may be specialized to perform various service types (e.g., autonomous vehicle maintenance, vehicle maintenance, body repair, battery charging, wet cleaning, dry cleaning, etc.). Transportation management system 110 may utilize information from client computing device 224 in matching an autonomous vehicle to a service center.

In particular embodiments, service center data may be maintained in a service center data store 223. When a service center is matched to an autonomous vehicle, information relevant to that service center may be retrieved and/or accessed from service center data store 223. For example, if an autonomous vehicle is matched to service center 180B, location information of location 194 (e.g., an address, a latitude and a longitude, etc.) of service center 180B, a size of service center 180B, and/or availability data may be retrieved from service center data store 223. Similarly, service center data may be looked up for a battery charging, cleaning, and/or a maintenance facility, such as size, location, services provided, etc. For example, a battery charging facility may be associated with data describing the type of battery charging available (e.g., standard charger, fast charger, etc.) and type of battery charging station (e.g., manual or automatic).

In particular embodiments, service center data may also include average charge times for different types of autonomous vehicles, how long a typical charge will last in different autonomous vehicles, and/or a charge history for autonomous vehicles that have used one or more specific charging stations. In a similar fashion, a service center may be associated with data describing the types of cleaning services, and typical cleaning times.

In particular embodiments, sensors 238 may include one or more sensors, or sensor arrays, used to identify objects around an autonomous vehicle, as well as a roadway, a lane, a direction, a location, and other objects and roadway conditions the autonomous vehicle may encounter. In one example, sensors 238 may include electromagnetic sensors, including RADAR, LiDAR, infrared, ultraviolet, optical, and other sensors, acoustic sensors, position sensors, and other sensors. In a second example, sensors 238 may include multi-axis accelerometers and/or gyroscopes, weight scales, moisture sensors, in-vehicle cameras, and/or other sensors configured to monitor the interior status, contents, and/or motion of the autonomous vehicle. For instance, accelerometers may measure motion of the autonomous vehicle's cabin as the autonomous vehicle travels on different roads or different parts of a single road. In another example, sensors 238 may include various sensors described herein.

In particular embodiments, scales may be used to monitor seats, floors, and/or other user-accessible areas of the autonomous vehicle's cabin and/or may detect whether the weight of the cabin has changed, which may indicate a potential lost item left behind by a passenger or a potential spill. The sensor data may be stored in traffic pattern data store 218 and/or road condition data store 220. For example, the sensor data may be analyzed by client computing device 224. Although shown as distinct data stores, in particular embodiments, traffic pattern data and road condition data, along with raw sensor data, location data, and/or any other type of data gathered by transportation management system 110 may be stored and/or maintained by a single data store, such as a transportation management system data store.

In particular embodiments, dispatch module 210 may include a software module that may be configured to process ride requests, ride responses, and/or other communications between ride requestors and providers of transportation management system 110 to match a requestor and a provider for a requested transportation service. For example, a ride request may be received from requestor computing device 130, the ride request can include a pickup location and one or more destination and/or drop-off locations.

In particular embodiments, dispatch module 210 may be configured to determine a dispatch type for a ride request based at least on one or more criteria associated with a route and/or a ride requestor. For example, the ride request may be originating in an area not served by autonomous vehicles, or the ride requestor's account may be associated with preference data indicating that human-driven vehicles should be preferentially dispatched whenever possible. For instance, dispatch module 210 may send an instruction to an autonomous vehicle computing device 150 associated with an autonomous vehicle to go to a pickup location based at least on the one or more criteria associated with the route and/or the ride requestor. In particular embodiments, a particular route may be determined by route selection module 212. For example, route selection module 212 may identify one or more autonomous vehicle routes from autonomous route data 222 to use based at least on current traffic, weather, and/or other roadway conditions. Additionally, or alternatively, route selection module 212 may be configured to select a default route for an autonomous vehicle based at least on how recently data was collected for that route.

In particular embodiments, one or more routes to a service center may be determined by route selection module 212. For example, if an autonomous vehicle experiences a service related issue (e.g., a sensor malfunction, a sensor failure, low tire pressure, oil pressure drop, low battery charge, etc.), route selection module 212 module may determine a route to a service center. For instance, route selection module 212 module may determine a route to a service center that was matched to the autonomous vehicle by logistics module 217. In particular embodiments, route selection module 212 may determine one or more operational restrictions that may be utilized by the autonomous vehicle as the autonomous vehicle travels the route to the service center. For example, the one or more operational restrictions may include a limit of speed, a directive and/or rule not to utilize a highway and/or freeway, and/or come to a complete before crossing a railroad crossing, among others. In particular embodiments, route selection module 212 may determine a route to a service center based on one or more service related issues of the autonomous vehicle. For example, the autonomous vehicle may not be able to execute a right-hand turn, and route selection module 212 may determine a route to the service center that includes only left-hand turns. In one instance, the autonomous vehicle may have a mechanical malfunction that prevents the autonomous vehicle from executing right-hand turns. In another instance, the autonomous vehicle may have a sensor malfunction that prevents autonomous vehicle computing device 150 from determining that an execution of a right-hand turn is safe for the autonomous vehicle and/or others (e.g., pedestrians, other vehicles, etc.).

In particular embodiments, one or more autonomous vehicle routes may be defined in data store 222. For example, these autonomous vehicle routes may be defined from designated pickup and drop-off locations in a geographic area. If the pickup and drop-off locations received in the ride request are each within one or more threshold distances of the designated pickup and drop-off locations, the autonomous vehicle ride type may be presented as an option to ride requestor 135. Additionally, or alternatively, autonomous vehicle regions may be defined in data store 222 for a geographic region. For example, each autonomous region may be associated with mapping, driving, and/or roadway conditions that allow autonomous vehicles to navigate between locations within the region.

In particular embodiments, autonomous vehicle monitor module 214 may request vehicle status information from each autonomous vehicle computing device 150. When an autonomous vehicle has completed a ride, autonomous vehicle monitor module 214 may determine if the autonomous vehicle may be made available for additional rides or if the autonomous vehicle needs service work. For example, autonomous vehicle monitor module 214 can maintain status thresholds and/or status rules. In particular embodiments, one or more status thresholds may be defined for various metrics collected by vehicle status monitor 234. For example, the one or more status thresholds may include one or more of a driving time, a number of rides, and a number of miles, among others.

In particular embodiments, the autonomous vehicle status information received from vehicle status monitor 234 may be compared to the one or more thresholds. If one or more metrics have exceeded a threshold, the autonomous vehicle may be routed to a service center. Additionally, or alternatively, status rules may be defined for vehicle maintenance codes, such as check engine codes, tire pressure codes, and oil level codes, among others. If a maintenance code is sent from the vehicle status monitor 234, it may be compared to the status rules and, if the maintenance code satisfies one or more of the rules, the autonomous vehicle may be routed to a service center. For example, each maintenance code may be associated with a different value indicating if service work needs to be performed immediately or if the service work may be deferred (e.g., "high," "medium," or "low," a numerical 1-10, or other value(s)).

In particular embodiments, autonomous vehicle monitor module 214 may determine service work needs across the current fleet of autonomous vehicles and may determine if one or more autonomous vehicles need to be routed for service work. For example, if a number of autonomous vehicles that are currently undergoing service work is high, and a maintenance code is associated with a "low" value, the service work may be deferred until service work has been completed on other autonomous vehicles. In particular embodiments, autonomous vehicle status monitor 234 may be configured to request cleaning services based on data collected by sensors 238. For example, if sensors 238 detect vehicle conditions indicating a cleaning issue, such as a spill, vehicle status monitor 234 may send a request to transportation management system 110 indicating that the autonomous vehicle requires cleaning. For example, the request may include a cleaning type, such as wet cleaning or dry cleaning. Logistics module 217 may determine a service center that provides an appropriate cleaning service, and dispatch module 210 may dispatch the autonomous vehicle to the determined service center.

In particular embodiments, autonomous data management module 216 may request sensor and/or location data from each autonomous vehicle computing device 150 of each autonomous vehicle 160. Autonomous data management module 216 may correlate vehicle location and/or speed of each corresponding autonomous vehicle 160 and/or may store the data in traffic pattern data store 218. In particular embodiments, accelerometer data may be correlated and/or associated with location data and/or may be stored in road condition data store 220. In particular embodiments, one or more data review applications 230 may access traffic pattern data store 218 and/or road condition data store 220. For example, traffic pattern data and/or road condition data may be mapped and/or visualized over one or more periods of time. As more data is received from autonomous vehicle computing devices 150 over time, traffic pattern data and/or road condition data may vary, as patterns and/or conditions change. In particular embodiments, recently collected data may be weighted relative to older collected data, which may cause recently detected changes to patterns and/or conditions to more quickly replace the patterns and conditions determined based at least on older data.

In particular embodiments, logistics module 217 may maximize availability of autonomous vehicles to ride requestors. For example, logistics module 217 may access information of one or more of data stores 218-223 and may utilize the information to maximize availability of autonomous vehicles to ride requestors 135. In particular embodiments, logistics module 217 may access historic data associated with supply and demand for autonomous vehicles in a fleet of autonomous vehicles. For example, the historic data for autonomous vehicles may be specific to a region in which autonomous vehicles 160 operate or to particular locations within the region in which autonomous vehicles 160 operate, or may be specific to autonomous vehicles 160 with particular characteristics.

In particular embodiments, logistics module 217 may receive data associated with current conditions and/or future events that are likely to affect demand for autonomous vehicles in the future. For example, logistics module 217 may receive data associated with a future event that may be a known as an upcoming event that is likely to affect demand in a region in which fleet of autonomous vehicles 160 operate, such as a concert, sporting event, or storm event, among others. In particular embodiments, logistics module 217 may receive data associated with an upcoming event that is predicted to take place based on machine learned patterns of events that affect demand in a region in which autonomous vehicles 160 operate. For example, a time and duration of rush hours on particular days may be predicted based on machine learned patterns of traffic. For instance, the machine learned patterns of traffic may be determined from traffic pattern data store 218 and/or road condition data store 220, among others.

In particular embodiments, autonomous vehicle monitor module 214 may receive data associated with a status of autonomous vehicle 160 and/or one or more of service centers 180, 181, and 182 and/or associated with a condition affecting traffic in the region in which autonomous vehicles 160 operate. For example, autonomous vehicle monitor module 214 may receive status information from the autonomous vehicles 160 and/or one or more of service centers 180, 181, and 182 and/or may receive notifications about current events (such as traffic accidents, weather events, road construction, etc.) from autonomous vehicle computing devices 150, from one or more of service centers 180, 181, and 182, and/or from third parties or external services (such as news services, weather services, government information services, etc.).

In particular embodiments, logistics module 217 may generate a prediction of demand for autonomous vehicles 160, including a predicted demand level and/or a predicted duration of the predicted demand level, based at least on historic data and received data. Generating the prediction of demand may be further based at least on respective characteristics of one or more autonomous vehicles 160 and/or may be further based at least on the capabilities, available capacity, speed of operations, and/or locations of service centers 180, 181, and/or 182. In particular embodiments, the generated prediction of demand may include a respective predicted demand level for each of multiple locations within a region in which autonomous vehicles 160 operate and/or for autonomous vehicles 160 associated with and/or having particular one or more characteristics. For example, a generated prediction of demand for a luxury vehicle may be quite different from a generated prediction of demand for a vehicle having built-in child safety seats, and these generated predictions of demand may vary at different locations within a region, at different times of day, and/or on different days (e.g., work days, weekend days, holidays, etc.).

In particular embodiments, autonomous vehicle monitor module 214 may determine that an autonomous vehicle 160 is in need of service, and/or logistics module 217 may identify a service center suitable for servicing autonomous vehicle 160 and/or may determine a time at which autonomous vehicle 160 is to be serviced at the identified service center, based at least on the prediction of demand, after which logistics module 217 may schedule autonomous vehicle 160 for service work. For example, logistics module 217 may be configured to determine (e.g., based at least on a status and/or other data received from autonomous vehicle 160) that autonomous vehicle 160 is due for periodic maintenance and/or inspection, that a battery of autonomous vehicle 160 needs to be charged, that autonomous vehicle 160 needs to be refueled, and/or that autonomous vehicle 160 is in need of one or more repairs, among others.

In particular embodiments, logistics module 217 may identify and/or match a service center that is suitable for servicing autonomous vehicle 160, which may be based at least on particular service work to be performed on autonomous vehicle 160 and/or based at least on one or more capabilities of respective service centers to perform the service work. For example, autonomous vehicle monitor module 214 may receive respective status information from one or more of service centers 180, 181, and/or 182 including capability information.

In particular embodiments, logistics module 217 may compute a score for a service center based at least on one or more attributes associated with the service entity. For example, the one or more attributes may include one or more of predicted amounts of wait time for service work, actual amounts of wait time for service work, predicted amounts of time for service work, actual amounts of time for service work, accuracies of pledged availabilities for service work, accuracies of pledged speed for service work (e.g., how fast service work is performed), and whether problems persist, among others. In particular embodiments, the one or more attributes may be weighted. For example, a first attribute of the one or more attribute may be weighted greater than a second attribute of the one or more attributes. For instance, attributes may be given values with respect to one-another in computing the computed score for a service entity. In particular embodiments, service entities may utilize a computer system to sign-up to provide service to autonomous vehicles. For example, service entities may utilize a user interface (UI) 242, of client computer device 224, to sign-up to provide service to autonomous vehicles. In one instance, a company may utilize a UI 242A, illustrated in FIG. 2B. In another instance, an individual may utilize a UI 242B, illustrated in FIG. 2C.

In particular embodiments, a selection between an internal service center (e.g., a service center that is owned and/or operated by an entity that owns and/or operates the autonomous vehicles) and a third-party service provider may be based on one or more of a value, a cost metric (e.g., a partner center may be preferable if a threshold is met), wait times for service work, availability for service work, an inventory, and a location, among others. For example, logistics module 217 may match an autonomous vehicle that needs service work with an internal service center or a third-party service center based at least on these attributes, among others.

In particular embodiments, logistics module 217 may match a service center with an autonomous vehicle based at least on features of a geographic region. In one example, a feature of a geographic region may include a density. In one instance, a density may include a population density, which may affect one or more traffic patterns at one or more times of a day. In another instance, a density may include a road density, which may affect one or more traffic patterns (e.g., a greater road density may permit traffic to move more expediently than a lesser road density, which may not have as many roads per unit of area). In another example, a feature of a geographic region may include one or more traffic patterns. In one instance, one or more traffic patterns may be associated with respective one or more times of a day (e.g., morning rush hour, lunch hour, evening rush hour, etc.). In a second instance, one or more traffic patterns may be associated with respective one or more times days of a week (e.g., week days, weekend days, etc.). In a third instance, one or more traffic patterns may be associated with respective one or more holidays (e.g., Christmas holidays, government holidays, etc.). In another instance, one or more traffic patterns may be associated with respective one or more festivals/conventions (e.g., a festival of lights, Austin City Limits (ACL) Festival, South by Southwest (SXSW) festival, a business convention, a parade, etc.).

In particular embodiments, logistics module 217 may match a service center with an autonomous vehicle based at least on one or more service center models. In one example, a service center model may include a large, medium, or small service center model. In one instance, a large, medium, or small service center model may be associated with respective sizes of inventories of parts for different types of vehicles (e.g., a large service center model may be associated with a large inventory of parts for different types of vehicles than a small service center model). In a second example, a service center model may include a mobile service center model. For instance, a mobile service center model may be associated with one or more abilities to travel to different locations to service autonomous vehicles. In another example, a service center model may include a distributed service center model. In one instance, a distributed service center model may include service centers that are distributed throughout a geographic region. In another instance, a distributed service center model may include service centers that are distributed throughout a geographic region and provide different services, based at least on their respective locations.

In particular embodiments, logistics module 217 may match a service center with an autonomous vehicle based at least on an available capacity of a service center. In one example, a service center may have a current available capacity to service the autonomous vehicle. In another example, a service center may have a future available capacity to service the autonomous vehicle. For instance, the service center may have available capacity to service the autonomous vehicle by a time the autonomous vehicle arrives at a location of the service center.

In particular embodiments, logistics module 217 may match a service center with an autonomous vehicle based at least on one or more current attributes of the autonomous vehicle. In one example, a current attribute of the autonomous vehicle may include a range of the autonomous vehicle. In one instance, the range may be a maximum amount of distance the autonomous vehicle may travel with an amount of stored battery charge. In another instance, the range may be a maximum amount of distance the autonomous vehicle may travel with an amount of stored fuel. In a second example, a current attribute of the autonomous vehicle may include a maximum speed that the autonomous vehicle may travel. In one instance, autonomous vehicle computing device 150 of the autonomous vehicle may determine the maximum speed that the autonomous vehicle may travel. In another instance, transportation management system 110 may determine the maximum speed that the autonomous vehicle may travel. In another example, a current attribute of the autonomous vehicle may include an ability to travel a distance during current weather conditions or future weather conditions. For instance, if a future weather condition includes rain, an ability to travel a distance during rain may be limited or non-existent.

In particular embodiments, logistics module 217 may determine a time at which autonomous vehicle 160 is to be serviced further based at least on a characteristic of autonomous vehicle 160, one or more capacities of various service centers to perform the service work at particular times, an estimated amount of time required to perform the service work at the one or more of service centers 180, 181, and/or 182, and/or estimates of a travel time from a current location of autonomous vehicle 160 to the one or more of service centers 180, 181, and/or 182. In particular embodiments, determining the time at which the given autonomous vehicle is to be serviced may include determining, based at least on the generated prediction of demand, a default interval between service appointments for multiple autonomous vehicles 160 and/or determining, based at least on the generated prediction of demand, an order in which the multiple autonomous vehicles 160 of autonomous vehicles are to be serviced. In particular embodiments, logistics module 217 may provide instructions to autonomous vehicle 160 to drive to a determined service center for scheduled service work at a determined service time. In one example, logistics module 217 may provide instructions 155A to autonomous vehicle 160E to drive to service center 180A.

In another example, logistics module 217 may provide instructions 155C to autonomous vehicle 160G to drive to service center 181B. In particular embodiments, logistics module 217 or another portion of transportation management system 110 may be configured to communicate with autonomous vehicle 160 to provide navigation instructions and/or other commands to the vehicle, as described in further detail below. In particular embodiments, logistics module 217 may provide, to client computing device 217, service information may include access information and/or authorization information that may be utilized by the service center to access the autonomous vehicle and/or service the autonomous vehicle. In particular embodiments, a service center may be granted and/or provided with an authorization to access and/or operate an autonomous vehicle. In one example, the service center may be granted and/or provided with an ability to unlock the autonomous vehicle. In a second example, the service center may be granted and/or provided with an ability to drive the autonomous vehicle. In another example, the service entity may be granted and/or provided with an ability to operate the autonomous vehicle. In particular embodiments, an authorization to access and/or operate an autonomous vehicle may be based at least on one or more of a time period and/or one or more locations. In one example, the service center may be granted and/or provided with an authorization to access and/or operate during one or more time periods. In another example, the service center may be granted and/or provided with an authorization to access and/or operate at one or more locations. For instance, the authorization to access and/or operate the autonomous vehicle may be location-based.

In particular embodiments, logistics module 217 may determine one or more sequences of service works to be performed on autonomous vehicles 160. For example, determining one or more sequences of service works to be performed on autonomous vehicles 160 may aid and/or assist in maximizing availability of autonomous vehicles to ride requestors 135. In particular embodiments, logistics module 217 may access information of service center data store 223 and utilize one or more of a configuration of the determined service center, a current availability of charging stations of the determined service center, a future availability of charging stations of the determined service center, a wait time for service work, a rate for service work, a capacity for service work, a number of service work types offered, an availability for service work, operator cost (e.g., labor, parts, storage, real estate, etc.), an inventory of one or more items for service work, predicted amounts of wait time for service work, predicted amounts of time for service work, a number of autonomous vehicles currently being serviced, and a number of autonomous vehicles that are scheduled to be serviced, among others, in determining one or more sequences of service works to be performed on autonomous vehicles 160.

In particular embodiments, transportation management system 110 may provide compensation information, associated with service work information, to one or more service entities. For example, transportation management system 110 may provide one or more compensations (e.g., pricing) respectively associated with one or more service works to be performed on an autonomous vehicle. In particular embodiments, transportation management system 110 may vary and/or alter the compensation information at one or more times. In one example, if a service center has not responded to a request for service work to be performed, within an amount of time transpiring, transportation management system 110 may increase an amount of compensation (e.g., an amount of money, an amount of credits, an amount of crypto-currency, an amount of currency, etc.) associated with the service work to be performed. For instance, transportation management system 110 may increase the amount of compensation associated with the service work to be performed until transportation management system 110 receives a response from a service entity to perform the service work requested. In another example, if multiple service entities reply and/or respond to a request for service work to be performed, transportation management system 110 may decrease an amount of compensation associated with the service work to be performed for one or more service works to be performed.

In particular embodiments, transportation management system 110 may include a demand model generation system, which may be configured to access historic supply and demand data, receive data 170 from service center(s) 180 and/or 181, receive data 165 from one or more autonomous vehicles 160, and generate a prediction of demand for autonomous vehicles 160 based on these inputs. For example, data 170A and/or 170B from service center(s) 180 and/or data 170C and/or 170D from service center(s) 181 may include data representing service center status, capabilities, estimated times for performing particular services (e.g., estimated amounts of time for service work), location information, available capacity for service work, and types of cleaning services, among others. As another example, data 165 received from autonomous vehicles 160 may include vehicle sensor data, vehicle status information, such as mileage and/or a time interval since the autonomous vehicle was last serviced, and/or data indicating that the autonomous vehicle is in need of fuel, a battery charge, an oil change, a car wash, and/or a repair to fix or replace a broken sensor and/or address a wear-and-tear condition, among others.

In particular embodiments, transportation management system 110 may match autonomous vehicles to service center(s) 180, 181, and/or 182 based at least on historic data. For example, the historic data may include, for each service center, one or more of measured wait times for service work to be performed, past predicted wait times for service work to be performed, measured times for service work that was performed, past predictions of amounts of time for service work that was performed, and past parts inventories, among others. For instance, the historic data may be utilized in computing a score for each service center.

In particular embodiments, a computed score for a service center may be based at least on one or more attributes associated with the service center. For example, the one or more attributes may include one or more of predicted amounts of wait time for service work, amounts of wait time for service work, predicted amounts of time for service work, amounts of time for service work, accuracies of pledged availabilities for service work, accuracies of pledged speed for service work (e.g., how fast service work is performed), and if problems persist, among others. In particular embodiments, the one or more attributes may be weighted. For example, a first attribute of the one or more attribute may be weighted greater than a second attribute of the one or more attributes. For instance, attributes may be given values with respect to one-another in computing the score for a service center.

In particular embodiments, valuing attributes with respect to one-another in computing the score for a service center may include valuing a first attribute of the one or more attribute associated with one or more repairs for an issue greater than a second attribute of the one or more attribute associated with one or more symptomatic procedures for the issue. For example, an issue may include low tire pressure. In one instance, the first attribute may be associated with a first service center that may repair a leak in a tire, while the second attribute may be associated with a second service center that may add air to the tire. In another instance, the first attribute may be associated with a first service center that may replace a tire, while the second attribute may be associated with a second service center that may add air to the tire. In particular embodiments, valuing attributes with respect to one-another in computing the score for a service center may include valuing a first attribute of the one or more attribute associated with one or more root-cause repairs for an issue greater than a second attribute of the one or more attribute associated with one or more symptomatic treatments for the issue. For example, a tire may be damaged, and adding air to the tire may be a symptomatic treatment, while repairing a leak of the damage tire or replacing the damaged tire may be a root-cause repair for the damaged tire. For instance, a first attribute may be associated with a first service center that may address an underlying issue (e.g., root-cause) may be valued greater than a second attribute may be associated with a second service center that may address a symptom of the underlying issue.

In particular embodiments, valuing attributes with respect to one-another in computing the score for a service center may include valuing a first attribute of the one or more attribute associated with a first service center that services a particular make of an autonomous vehicle greater than a second attribute of the one or more attribute associated with a second service center that provides general services for autonomous vehicles. In particular embodiments, valuing attributes with respect to one-another in computing the score for a service center may include utilizing data that is publicly available. In one example, a first service center may have received more favorable reviews than a second service center, based at least on the data that is publicly available, and a first attribute may be associated with the first service center may be valued greater than a second attribute of the one or more attribute associated with the second service center. For instance, the first service center may have received more favorable reviews on YELP than the second service center. In another example, a first service center may have received more affirmative affinities than a second service center, based at least on the data that is publicly available, and a first attribute may be associated with the first service center may be valued greater than a second attribute of the one or more attribute associated with the second service center. For instance, the first service center may have received more "Likes" on FACEBOOK than the second service center.

Figure 2B:
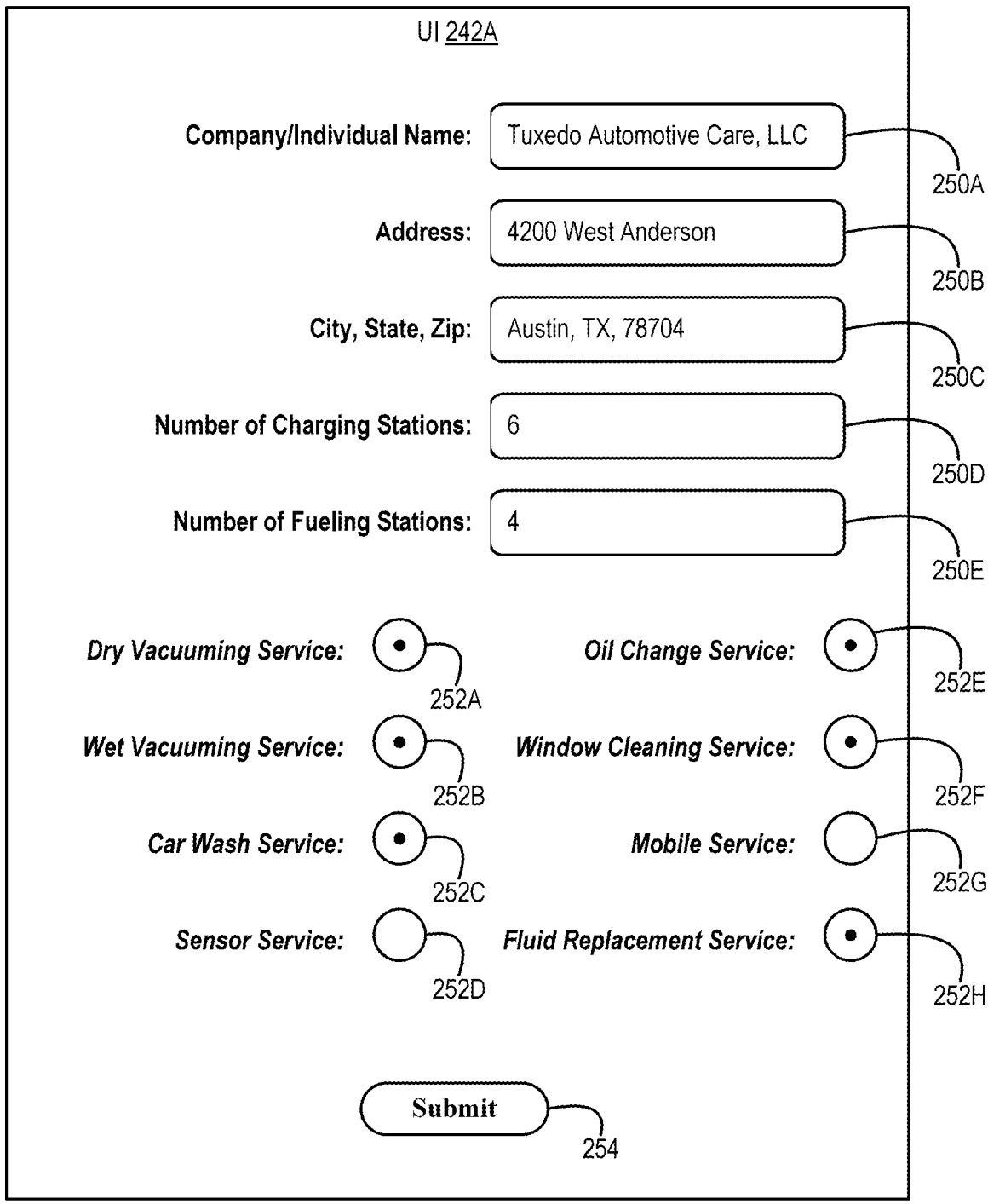
FIGS. 2B and 2C illustrate examples of user interfaces, according to one or more embodiments.

Turning now to FIG. 2B, a UI 242A is illustrated, according to one or more embodiments. As shown, UI 242A may include text input areas 250 and check buttons 252. In particular embodiments, UI 242A may be utilized to sign up third-party service work. As illustrated, for example, UI 242A may be utilized to sign up a company, "Tuxedo Automotive Care, LLC". For instance, a company/individual name, an address, a city/state/zip, a number of charging stations, and a number of fueling stations may be input into respective text input areas 250A-250E.

In particular embodiments, a check input button 252 may indicate a "yes" or "no" input. For example, check buttons 252A-252H may indicate a "yes" or "no" input for a dry vacuuming service, a wet vacuuming service, a car wash service, a sensor service, an oil change service, a window cleaning service, a mobile service, and a fluid replacement service (e.g., windshield washer fluid, coolant fluid, etc.), respectively. In one instance, as illustrated, the third-party, "Tuxedo Automotive Care, LLC", may offer a dry vacuuming service, a wet vacuuming service, a car wash service, an oil change service, a window cleaning service, and a fluid replacement service. In another instance, as shown, the third-party, "Tuxedo Automotive Care, LLC", may not offer a sensor service and a mobile service. In particular embodiments, a submission button/icon 254 may be utilized and/or actuated to submit sign up information of UI 242A to transportation management system 110.

Figure 2C:
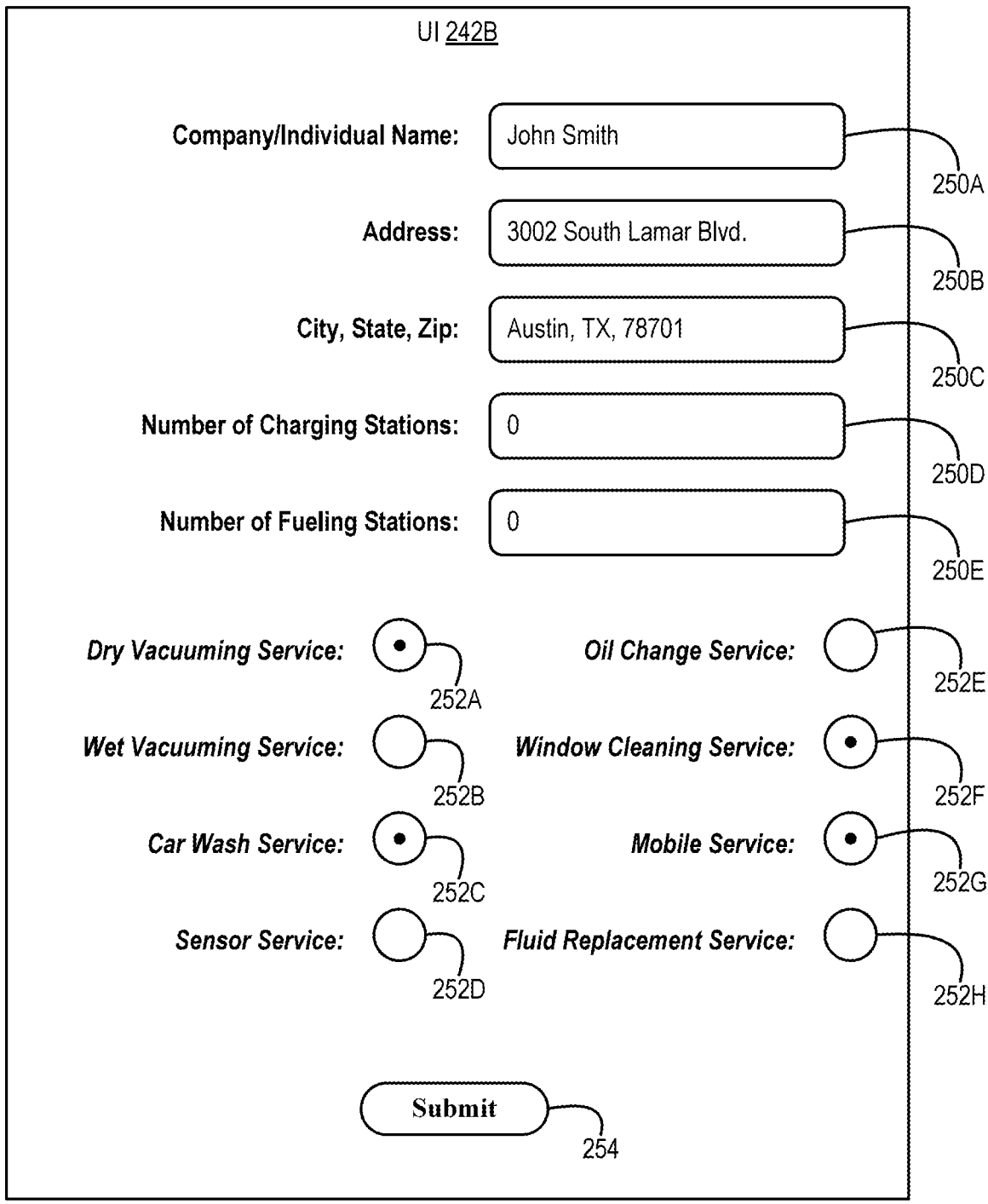

Turning now to FIG. 2C, a UI 242B is illustrated, according to one or more embodiments. As shown, UI 242B may include text input areas 250 and check buttons 252. In particular embodiments, UI 242B may be utilized to sign up third-party service work. As illustrated, for example, UI 242B may be utilized to sign up an individual, "John Smith". For instance, a company/individual name, an address, a city/state/zip, a number of charging stations, and a number of fueling stations may be input into respective text input areas 250A-250E.

In particular embodiments, a check input button 252 may indicate a "yes" or "no" input. For example, check buttons 252A-252H may indicate a "yes" or "no" input for a dry vacuuming service, a wet vacuuming service, a car wash service, a sensor service, an oil change service, a window cleaning service, a mobile service, and a fluid replacement service (e.g., windshield washer fluid, coolant fluid, etc.), respectively. In one instance, as illustrated, the third-party, "John Smith", may offer a dry vacuuming service, a car wash service, a window cleaning service, and a mobile service. In another instance, as shown, the third-party, "John Smith", may not offer a wet vacuuming service, a sensor service, an oil change service, and a fluid replacement service. In particular embodiments, a submission button/ icon 254 may be utilized and/or actuated to submit sign up information of UI 242B to transportation management system 110.

In particular embodiments, a service provider may be screened. For example, the service provider may be a person, and the person may be screened. For instance, screening the service entity may include performing a background check on the person, analyzing a past work history, and analyzing a past history with a ride service provider, among others. In particular embodiments, when an autonomous vehicle needs to be serviced, suitable service providers (e.g., service individuals) may be determined based at least on a service needed, a skill set, a location of the service provider, and an availability of the service provider, among others. For example, after determining one or more service individuals, the one or more service individuals may be notified by one or more of an APP, a text message (e.g., a short message service (SMS) message), and an email, among others. For instance, the one or more service individuals may reply to a notification with an acceptance or a declination to provide service work for one or more autonomous vehicles. In particular embodiments, after a service individual indicates an acceptance to provide service work, an autonomous vehicle may be instructed by transportation management system 110 to drive to a service center of the service individual.

Figure 3:
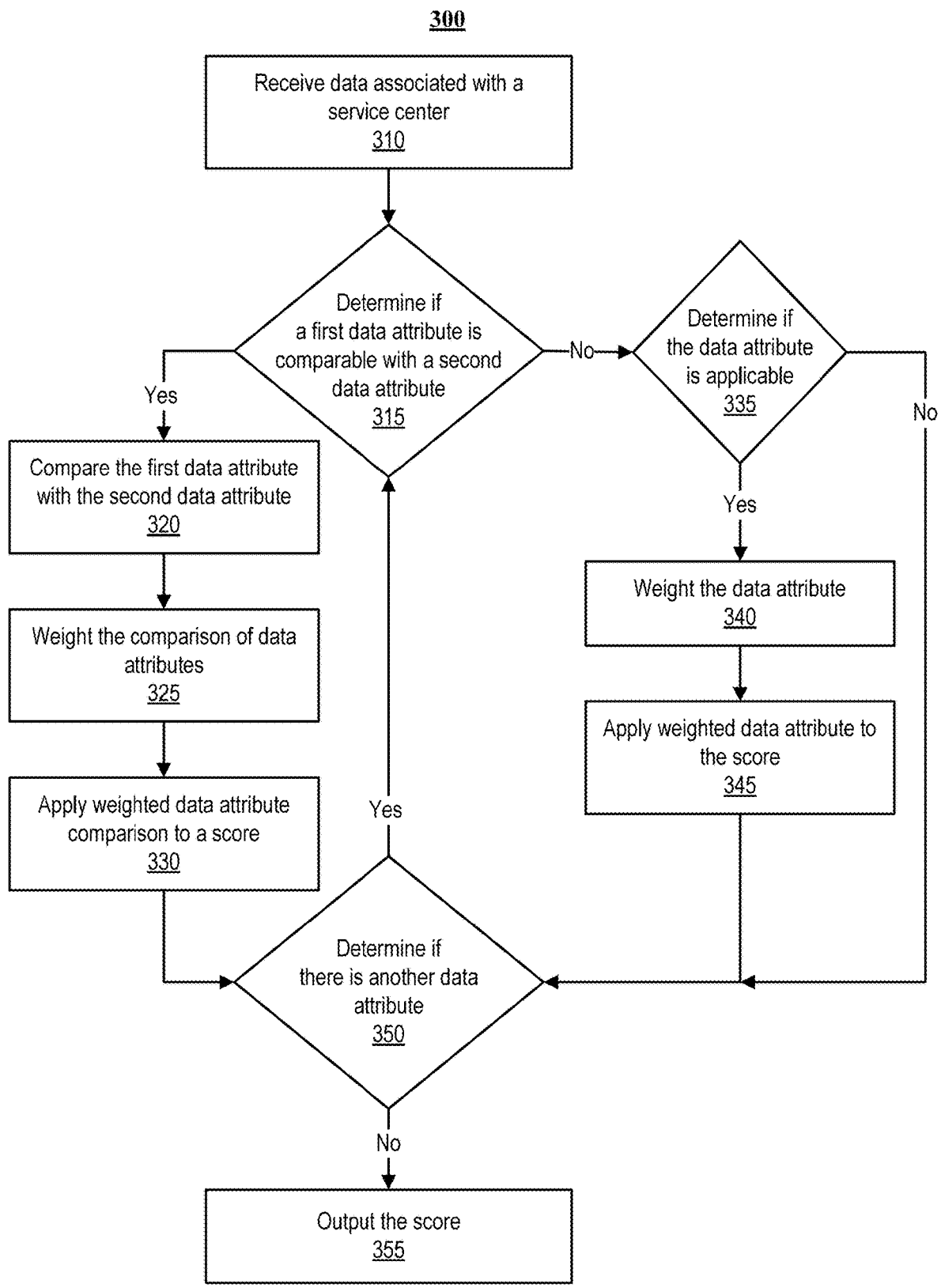
FIG. 3 illustrates an example method for determining a score of a service center, according to one or more embodiments.

Turning now to FIG. 3, an example method 300 for determining a score of a service center is illustrated, according to one or more embodiments. At step 310, data associated with a service center may be received. In particular embodiments, the data associated with the service center may include one or more data attributes. For example, the one or more data attributes may include one or more of a predicted wait time for a service work instance, an actual wait time for the service work instance, a rate (e.g., a speed) for the service work instance, a number of items in an inventory of the service center, a number of charging stations, location information associated with the service center, an offered service type (e.g., oil change, battery charging, petrol fueling, wet vacuuming, dry vacuuming, sensor replacement, etc.), a number of service bays, a price for a service type, and a number of problems that have persisted after service work, among others.

In particular embodiments, the data associated with a service center may be received from one or more sources. In one example, a portion of the data may be received from service center data store 223. In a second example, a portion of the data may be received from the service center. In one instance, one or more predicted times may be received from the service center. In a second instance, one or more actual times may be received from the service center. In a third instance, one or more of a number of items in an inventory of the service center, a number of charging stations, location information associated with the service center, an offered service type, a number of service bays, and a price for a service type, among others, may be received from the service center. In another example, a portion of the data may be received from one or more autonomous vehicles. For instance, one or more actual times may be received from the one or more autonomous vehicles.

At step 315, it may be determined if a first data attribute is comparable with a second data attribute. In one example, a first data attribute may be or include a predicted wait time for a service work instance, and a second data attribute may be or include an actual wait time for the service work instance. In another example, a first data attribute may be or include a predicted amount of time for a service work instance, and a second data attribute may be or include an actual amount of time for the service work instance. If a first data attribute is comparable with a second data attribute, the first data attribute may be compared with the second data attribute, at step 320. In one example, comparing the first data attribute the second data attribute may include taking a difference between the first data attribute and the second data attribute. In another example, comparing the first data attribute the second data attribute may include determining a ratio from the first data attribute and the second data attribute.

At step 325, a comparison of the first attribute and the second attribute may be weighted. In particular embodiments, the comparison of the first attribute and the second attribute may be weighted relative to another comparison of two attributes and/or may be weighted relative to another attribute. For example, a weight may include a number. For instance, the number may be multiplied with the comparison.

In particular embodiments, a weight of a data attribute may be determined via a value of a given parameter to one or more of autonomous vehicle utilization and profitability metrics, among others. In one example, if autonomous vehicle transportation service is urgently needed during a high demand period, a weighting of a distance and predicted versus an actual wait time might be higher than that of a price for servicing an autonomous vehicle. In another example, during low demand time periods a price for servicing an autonomous vehicle might be weighted more highly than distance parameters or wait time parameters, among others. In particular embodiments, a weight of a data attribute may be determined dynamically. In one example, a weight of a data attribute may be determined dynamically based at least on local or regional demand. In another example, a weight of a data attribute may be determined dynamically based at least on an autonomous vehicle fleet status. In particular embodiments, a scoring system, method, and/or process may be utilized to dynamically determine one or more weights of respective one or more data attributes.

At step 330, the weighted comparison may be applied to a score. In particular embodiments, the score may be a numerical value. In one example, the weighted comparison may be added to the score. For instance, the score may start with zero (0). In another example, the weighted comparison may be multiplied with the score. For instance, the score may start with one (1). In particular embodiments, the method may proceed to step 350.

If a first data attribute is not comparable with a second data attribute, it may be determined if the data attribute is applicable, at step 335. In particular embodiments, one or more data attributes may not be applicable to determining a score associated with a service provider. In one example, location information may not be applicable to determining a score associated with a service center. In other examples, applicable attributes may indicate and/or be associated with a fluid replacement service, an oil change service, a dry vacuuming service, a wet vacuuming service, a number of charging stations, a sensor service (e.g., sensor cleaning, sensor replacement, etc.), a capacity for the service work, a number of service work types offered, operator cost (e.g., labor, parts, storage, real estate, etc.), an inventory of one or more items for the service work, and/or scores based at least on predicted and actual amount of time associated with service work, among others. In particular embodiments, numerical values may be assigned to the applicable attributes associated with the service center. If the data attribute is not applicable, the method may proceed to step 350. If the data attribute is applicable, the data attribute may be weighted, at step 340. In particular embodiments, the data attribute may be weighted relative to a comparison of two attributes and/or may be weighted relative to another attribute. For example, a weight may include a number. For instance, the number may be multiplied with the data attribute.

At step 345, the weighted attribute may be applied to a score. In one example, the weighted attribute may be added to the score. For instance, the score may start with zero (0). In another example, the weighted attribute may be multiplied with the score. For instance, the score may start with one (1). At step 350, it may be determined if there is another attribute. If there is another attribute, the method may proceed to step 315, according to one or more embodiments. If there is not another attribute, the score may be outputted, at step 355. In one example, outputting the score may include displaying the score. For instance, the score may be displayed via a user interface. In another example, outputting the score may include storing the score. In one instance, the score may be stored in a memory medium. In another instance, the score may be stored in a data store (e.g., service center data store 223).

In particular embodiments, a score of a first service center may be utilized with a score of a second service center. For example, the score of the first service center may be compared with the score of the second service center. For instance, the comparison may indicate if it may be better to utilize the first service rather than the second service center. In particular embodiments, scores for multiple service centers may be utilized to rank the multiple service centers. For example, a service center with a score that meets or exceeds a threshold value may be selected to provide service work to an autonomous vehicle.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for matching autonomous vehicles with service entities including the particular steps of the method of FIG. 3, this disclosure contemplates any suitable method for matching autonomous vehicles with service entities including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, an optimization matching process or method may utilize dynamically updated scores for multiple service centers in providing optimized matches for autonomous vehicles requiring service. For example, the optimization matching process or method may attempt to provide optimized matches between a service center and an autonomous vehicle (based at least on dynamic scoring) in producing one or more outputs. For instance, providing optimized matches between a service center and an autonomous vehicle may be based at least on one or more of a highest probability of issue resolution on a first visit to a service center, a highest probability of issue resolution by a certain time, and a lowest all-inclusive cost to resolve a service issue (e.g., all inclusive may include cost of travel to service center, cost of waiting, cost of service, cost of vehicle's return to target area, etc.), among others.

Figure 4A:
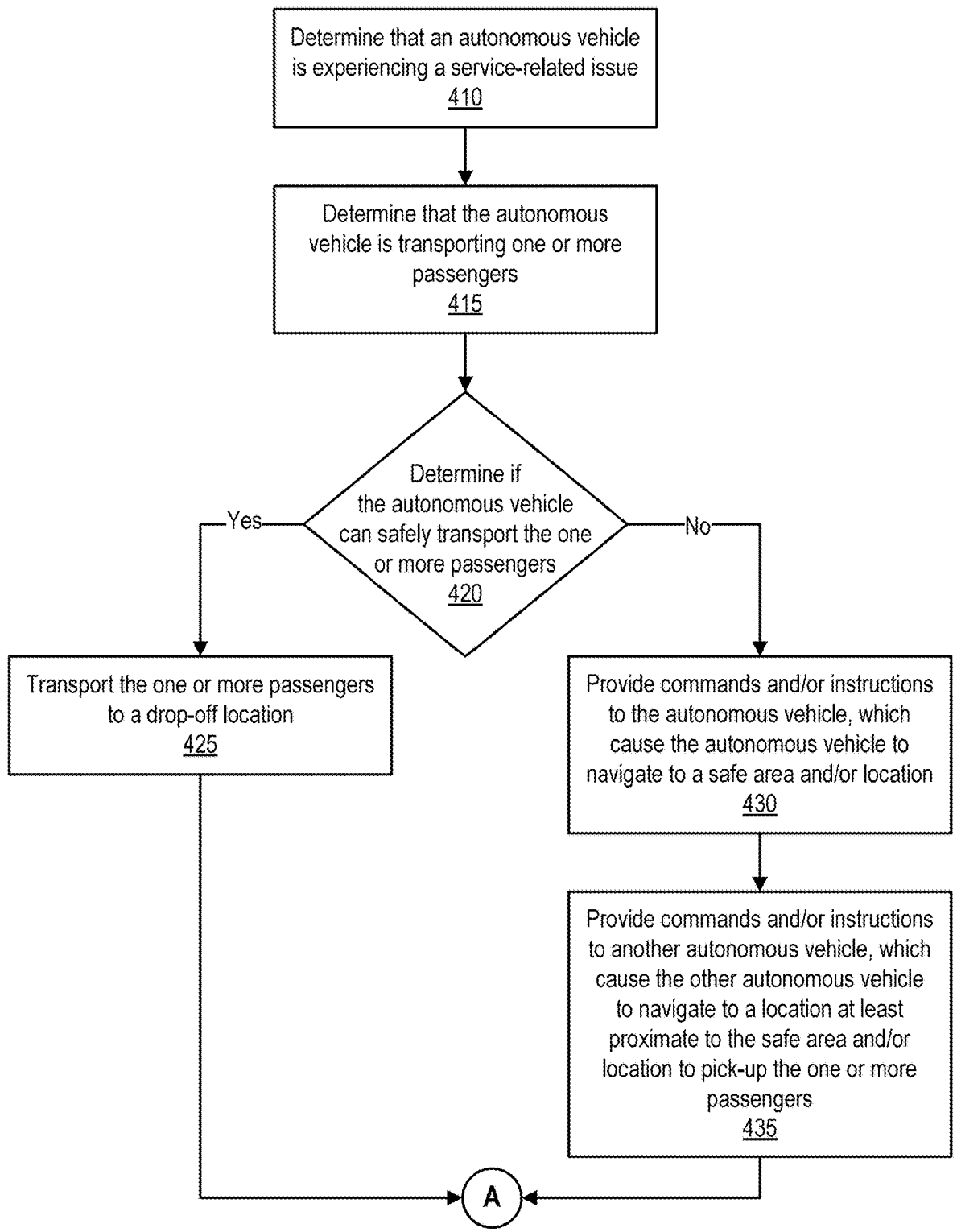
FIGS. 4A and 4B illustrate an example method for operating a transportation management system, according to one or more embodiments.
Figure 4B:
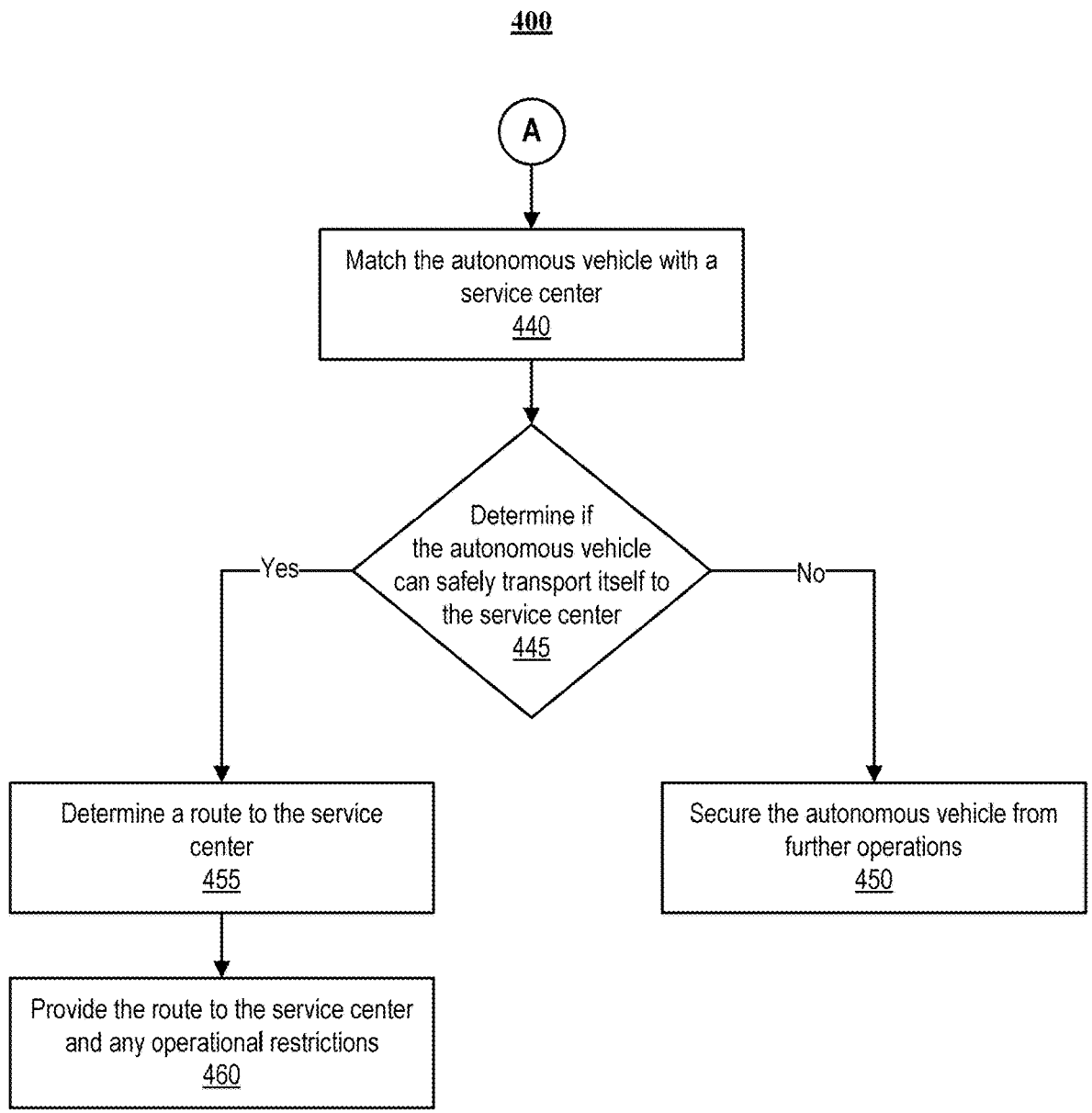

Turning now to FIGS. 4A and 4B, an example method 400 for operating a transportation management system is illustrated, according to one or more embodiments. At step 410, it may be determined that an autonomous vehicle is experiencing a service related issue. In particular embodiments, a service related of an autonomous vehicle issue may include an issue or a problem with the autonomous vehicle. For example, the issue or the problem may include a failed sensor, a malfunctioning sensor, a burned out headlight, a burned out taillight, a burned out turn signal light, a burned out cabin light, low tire pressure, a clog or an obstruction in a cabin air distribution system, a blown fuse, a broken window or windshield, a broken or failing air conditioning system, an oil leak, a fuel leak, a coolant leak, low oil pressure, or a low level of coolant, among others.

For instance, autonomous vehicle 160B may be experiencing a service related issue. In particular embodiments, determining a service related issue may include receiving data from a sensor of autonomous vehicle 160. For example, autonomous vehicle computing device 150 and/or transportation management system 110 may receive that data from the sensor of autonomous vehicle 160 and/or may determine a service related issue based at least on the data from the sensor of autonomous vehicle 160. In one instance, if a comparison of the data with one or more metrics exceeds a threshold, autonomous vehicle computing device 150 and/or transportation management system 110 may determine that there is the service related issue.

In another example, if a comparison of the sensor data, from autonomous vehicle 160, with one or more metrics falls below a threshold, autonomous vehicle computing device 150 and/or transportation management system 110 may determine that there is a service related issue. In particular embodiments, determining that there is a service related issue may include determining that data from a sensor of autonomous vehicle 160 has not been received within an amount of time. For example, if autonomous vehicle computing device 150 and/or transportation management system 110 does not receive data from the sensor of autonomous vehicle 160 within the amount of time, autonomous vehicle computing device 150 and/or transportation management system 110 may determine that there is the service related issue. In particular embodiments, if autonomous vehicle computing device 150 detects a service related issue with its autonomous vehicle 160, autonomous vehicle computing device 150 may notify transportation management system 110. For example, autonomous vehicle computing device 150 may provide information that a service related issue has been detected and/or information associated with a detected service related issue to transportation management system 110 via network 120.

At step 415, it may be determined that the autonomous vehicle is transporting one or more passengers. In one example, determining that the autonomous vehicle is transporting one or more passengers may include determining that autonomous vehicle 160 picked up one or more riders 135 at location 125, and that location information (e.g., latitude and longitude coordinates) of autonomous vehicle 160 and location information of the one or more riders 135 continue to coincide. In another example, determining that the autonomous vehicle is transporting one or more passengers may include utilizing one or more weight scales, one or more moisture sensors, one or more in-vehicle cameras, and/or one or more other sensors, of autonomous vehicle 160, configured to monitor an interior status and/or contents of autonomous vehicle 160. For instance, one or more of these sensors may indicate, to autonomous vehicle computing device 150 and/or transportation management system 110, that autonomous vehicle 160 is transporting one or more passengers.

At step 420, it may be determined if the autonomous vehicle can safely transport the one or more passengers. If the autonomous vehicle can safely transport the one or more passengers, the autonomous vehicle may transport the one or more passengers to a drop-off location, at step 425. For example, the autonomous vehicle may transport the one or more passengers to an originally scheduled and/or planned drop-off location. If the autonomous vehicle cannot safely transport the one or more passengers, commands and/or instructions may be provided to the autonomous vehicle, at step 430, which may cause the autonomous vehicle to navigate to a safe area and/or location. For example, autonomous vehicle 160B may be experiencing a service related issue. For instance, transportation management system 110 may determine that autonomous vehicle 160B cannot safely transport the one or more passengers, and transportation management system 110 may provide commands and/or instructions to autonomous vehicle computing device 150 of autonomous vehicle 160B to navigate to safe area and/or location 184.

At step 435, commands and/or instructions may be provided to another autonomous vehicle, which may cause the other autonomous vehicle to navigate to a location at least proximate to the safe area and/or location to pick-up the one or more passengers. In particular embodiments, transportation management system 110 may direct, instruct, and/or navigate another autonomous vehicle 160 to a location at least proximate to the location of autonomous vehicle 160 that is experiencing the service related issue, so that the one or more passengers may utilize the other autonomous vehicle 160 to arrive at a destination associated with the one or more people (e.g., a drop-off location). For example, transportation management system 110 may direct, instruct, and/or navigate autonomous vehicle 160C to a location at least proximate to safe area and/or location 184, so that the one or more passengers may utilize autonomous vehicle 160C to arrive at a destination associated with the one or more people (e.g., a drop-off location, such as location 125D, 125E, 125F, etc.).

At step 440, the autonomous vehicle may be matched with a service center. At step 445, it may be determined if the autonomous vehicle can safely transport itself to the service center. If the autonomous vehicle cannot safely transport itself to the service center, the autonomous vehicle may be secured from further operations, at step 450. In one example, securing the autonomous vehicle from further operations may include shutting down and/or turning off one or more systems and/or subsystems of the autonomous vehicle. In another example, securing the autonomous vehicle from further operations may include having the autonomous vehicle sit idle, until a human and/or another autonomous vehicle can intervene and/or assist the autonomous vehicle.

If the autonomous vehicle can safely transport itself to a service center, a route to the service center may be determined, at step 455. In particular embodiments, transportation management system 110 may determine and/or compute a route to a location of the matched service center. In one example, autonomous vehicle 160 may experience a sensor failure. For instance, transportation management system 110 may determine and/or compute a route to a location (e.g., a location of a service center, such as location 191, 192, 193, 194, 195, 196, 197, 198, 199, etc.) based at least on information associated with the sensor failure. In another example, autonomous vehicle 160 may experience a sensor malfunction. For instance, the sensor malfunction may be associated with dirt and/or grime that has accumulated on and/or within a sensor, and transportation management system 110 may determine and/or compute a route to a location (e.g., a location of a service center, such as location 191, 192, 193, 194, 195, 196, 197, 198, 199, etc.) based at least on information associated with the sensor malfunction.

In particular embodiments, transportation management system 110 may determine and/or compute a route to a location of the matched service center based at least on one or more of safety while traveling to the matched service center and success of travel to the matched service center, among others. For example, transportation management system 110 may determine and/or compute the route to the location of the matched service center that may be otherwise less efficient than another route. For instance, the route to the location of the matched service center may be determined and/or computed based at least on one or more performance limitations of autonomous vehicle 160 and/or circumventing the one or more performance limitations imposed by a sensor failure/malfunction or another service-related issue. In particular embodiments, determining and/or computing a route to a location when autonomous vehicle 160 suffers a malfunction and/or failure may include determining and/or computing a limit of speed and/or a type of road that may be safely navigated based on information associated with the malfunction and/or failure. For example, an accuracy of a computer vision system of autonomous vehicle 160 may be affected, and a limit of speed and/or a type of road that may be safely navigated may be determined and/or computed based on information associated with the accuracy of the computer vision system of autonomous vehicle 160. For instance, autonomous vehicle 160 may avoid highways and/or freeways.

At step 460, the routed and any operational restrictions may be provided to the autonomous vehicle. For example, transportation management system 110 may provide, via network 120, the route and any operational restrictions to autonomous vehicle computing device 150 of autonomous vehicle 160. For instance, one or more operational instructions may include a limit of speed at which autonomous vehicle 160 may travel, a type of road that autonomous vehicle 160 may travel, and/or one or more times of day that autonomous vehicle 160 may travel, among others.

Particular embodiments may repeat one or more steps of the method of FIGS. 4A and 4B, where appropriate. Although this disclosure describes and illustrates particular steps of the method of FIGS. 4A and 4B as occurring in a particular order, this disclosure contemplates any suitable steps of the method of FIGS. 4A and 4B occurring in any suitable order. Moreover, although this disclosure describes and illustrates an example method for matching autonomous vehicles with service entities including the particular steps of the method of FIGS. 4A and 4B, this disclosure contemplates any suitable method for matching autonomous vehicles with service entities including any suitable steps, which may include all, some, or none of the steps of the method of FIGS. 4A and 4B, where appropriate. Furthermore, although this disclosure describes and illustrates particular components, devices, or systems carrying out particular steps of the method of FIGS. 4A and 4B, this disclosure contemplates any suitable combination of any suitable components, devices, or systems carrying out any suitable steps of the method of FIGS. 4A and 4B.

Figure 5:
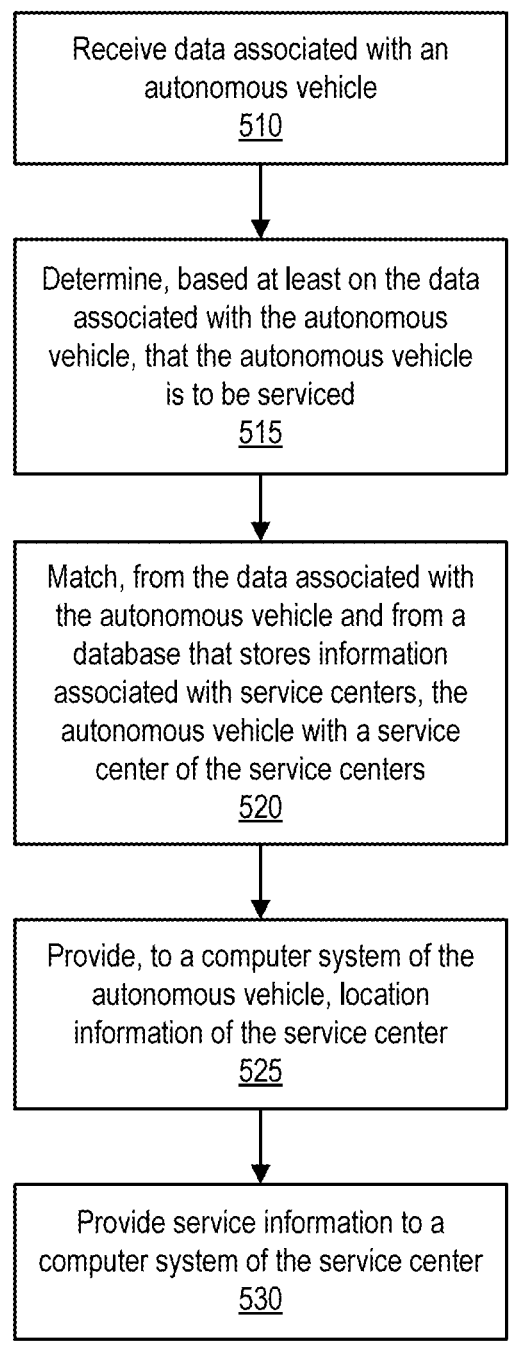
FIG. 5 illustrates an example method for matching autonomous vehicles with service centers, according to one or more embodiments.

Turning now to FIG. 5, an example method 500 for matching autonomous vehicles with service centers is illustrated, according to one or more embodiments. The method 500 may be at step 510, where data associated with an autonomous vehicle may be received. For example, transportation management system 110 may receive data associated with an autonomous vehicle 160. In particular embodiments, the data associated with the autonomous vehicle may include one or more of information that indicates an issue with the autonomous vehicle, information that indicates a problem with the autonomous vehicle, and information that indicates a scheduled maintenance of the autonomous vehicle, among others. For example, autonomous vehicle computing device 150 may provide the data associated with the autonomous vehicle to transportation management system 110.

At step 515, it may be determined, based at least on the data associated with the autonomous vehicle, that the autonomous vehicle is to be serviced. For example, transportation management system 110 may determine, based at least on the data associated with the autonomous vehicle, that the autonomous vehicle is to be serviced. In particular embodiments, determining that the autonomous vehicle is to be serviced may include determining that at least a portion of the data associated with the autonomous vehicle meets or exceeds a first threshold or meets or falls below a second threshold. In particular embodiments, determining that the autonomous vehicle is to be serviced may include a computer system of the autonomous vehicle determining that the autonomous vehicle is to be serviced.

In one example, the data associated with the autonomous vehicle may include a tire-pressure value, and transportation management system 110 may determine that the tire-pressure value is below a threshold value and may determine, based at least on the determination that the tire-pressure value is below the threshold value, that the autonomous vehicle is to be serviced. In a second example, the data associated with the autonomous vehicle may include a battery charge value, and transportation management system 110 may determine that the battery charge value is below a threshold value and may determine, based at least on the determination that the battery charge value is below the threshold value, that the autonomous vehicle is to be serviced. In a second example, the data associated with the autonomous vehicle may include information that indicates a sensor malfunction or failure. In a third example, the data associated with the autonomous vehicle may include information that indicates at least one sensors requires cleaning. In a fourth example, the data associated with the autonomous vehicle may include information that a battery discharge rate is below a threshold value. In another example, the data associated with the autonomous vehicle may include a refrigerant volume value, and transportation management system 110 may determine that the refrigerant volume value is below a threshold value and may determine, based at least on the determination that the refrigerant volume value is below the threshold value, that the autonomous vehicle is to be serviced. For instance, an ability to cool a passenger compartment of the autonomous vehicle may be based at least on the refrigerant volume value.

At step 520, the autonomous vehicle may be matched with a service center to service the autonomous vehicle, using the data associated with the autonomous vehicle and a database that stores information associated with service entities. For example, transportation management system 110 may match the autonomous vehicle, using the data associated with the autonomous vehicle and service center data store 223, with a service center. In particular embodiments, matching the autonomous vehicle with the service center to service the autonomous vehicle may be based at least on one or more of a wait time for service work, a rate for the service work, a capacity for the service work, a number of service work types offered, availability, operator cost (e.g., labor, parts, storage, real estate, etc.), transportation disruption risks, traffic patterns, road conditions, environmental factors (e.g., temperature, flooding, rain, snow, sleet, ice, etc.), a range of an autonomous vehicle, a max speed of an autonomous vehicle, a weather tolerance of an autonomous vehicle, a day/night functionality of an autonomous vehicle, current condition of an autonomous vehicle, a service record of a service entity, a scheduled maintenance of an autonomous vehicle, a service urgency value for the service work, an inventory of one or more items for the service work, a location for the service work, predicted amounts of wait time for service work, predicted amounts of time for service work, and scores for respective ones of the service centers, among others.

At step 525, location information of the service center may be provided to a computer system of the autonomous vehicle. For example, transportation management system 110 may provide, to autonomous vehicle computing device 150, location information of the service center. For instance, transportation management system 110 may be configured to provide navigation instructions and/or other commands 155 to autonomous vehicle 160. In particular embodiments, navigation instructions and/or other commands 155 may include prepositioning instructions indicating locations to which the autonomous vehicle 160 should be directed following the matching of autonomous vehicle 160 with the service center. In particular embodiments, the location of the service work may be or include a location of a service center that was matched to the autonomous vehicle (e.g., matched at step 520). In one example, the location information may include an address. In another example, the location information may include coordinates. For instance, the coordinates may include latitude and longitude coordinates. In particular embodiments, the location information may indicate a location of where a mobile service center will be. For example, the location information may indicate a location of where the autonomous vehicle will meet the mobile service center. For instance, the location of where the autonomous vehicle will meet the mobile service center may be or include a parking lot.

At step 530, service information may be provided to a computer system of the service center. For example, transportation management system 110 may provide service information a client computing device 224 of the matched service center. In particular embodiments, the service information may include one or more issues and/or problems associated with an autonomous vehicle. In particular embodiments, the service information may include access information and/or authorization information that may be utilized by the service center to access the autonomous vehicle and/or service the autonomous vehicle.

In particular embodiments, a service center may be granted and/or provided with an authorization to access and/or operate an autonomous vehicle. In one example, the service center may be granted and/or provided with an ability to unlock the autonomous vehicle. In a second example, the service center may be granted and/or provided with an ability to drive the autonomous vehicle. In a third example, the service entity may be granted and/or provided with an ability to operate the autonomous vehicle. In another example, the service center may be granted and/or provided with an ability to access and/or modify a configuration of a computer system of the autonomous vehicle. In one instance, the service center may be granted and/or provided with the ability to access and/or modify the configuration of the computer system of the autonomous vehicle to recalibrate a sensor and/or a sensor component and/or to access and/or modify the configuration for a newly installed sensor. In another instance, the computer system of the autonomous vehicle may be or include autonomous vehicle computing device 150.

In particular embodiments, an authorization to access and/or operate an autonomous vehicle may be based at least on one or more of a time period and/or one or more locations. In one example, the service center may be granted and/or provided with an authorization to access and/or operate during one or more time periods. In a second example, the service center may be granted and/or provided with an authorization to access and/or operate at one or more locations. For instance, the authorization to access and/or operate the autonomous vehicle may be location-based. In another example, transportation management system 110 may send an access code to client computing device 224 of the service center and/or send instructions to autonomous vehicle computing device 150, which may unlock features (e.g., safety features, maintenance access features, etc.) of autonomous vehicle 160 upon a determination that autonomous vehicle 160 has arrived at a location of the service center.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for matching autonomous vehicles with service entities including the particular steps of the method of FIG. 5, this disclosure contemplates any suitable method for matching autonomous vehicles with service entities including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
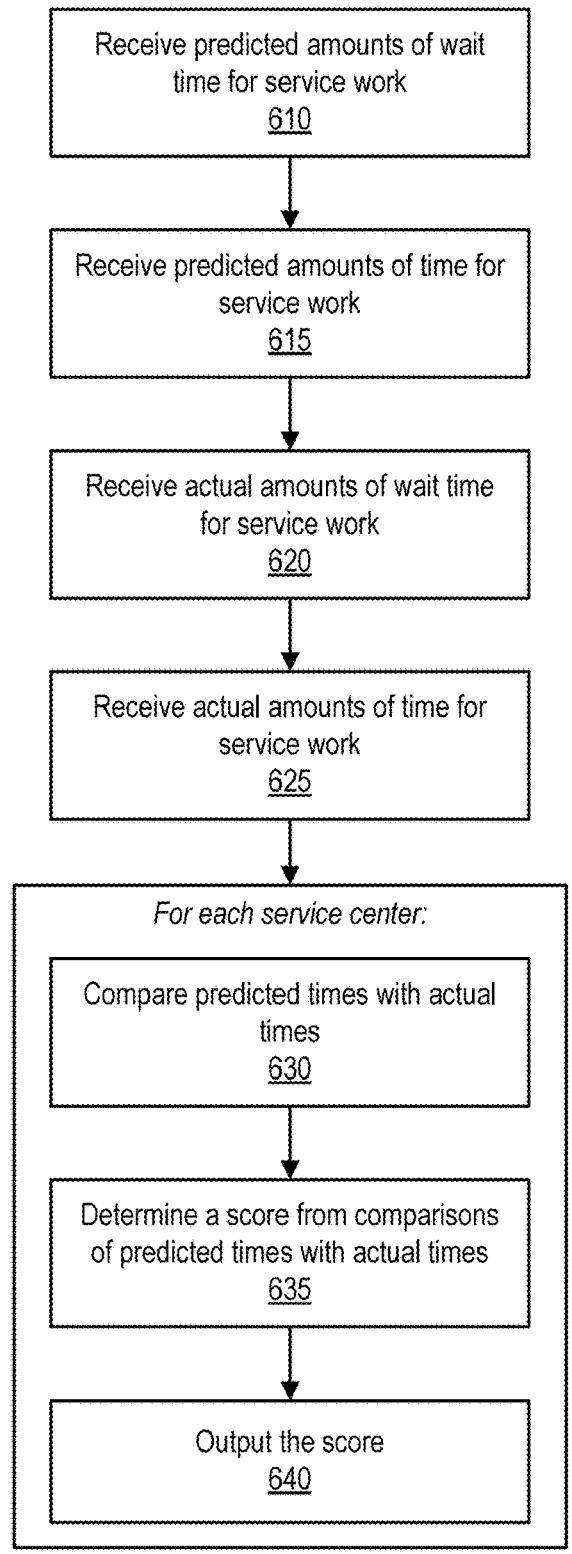
FIG. 6 illustrates an example method for matching autonomous vehicles with service entities, according to one or more embodiments.

Turning now to FIG. 6, an example method 600 for determining a score for service centers is illustrated, according to one or more embodiments. At step 610, predicted amounts of wait time for service work may be received. In particular embodiments, a predicted amount of wait time for service work may include a predicted amount of time that an autonomous vehicle will wait and/or sit idle, at a service center, before for service work begins. For example, the autonomous vehicle may arrive the service center before a member of the service center may provide the service work and/or before a service area (e.g., a service bay, a charging station, a vacuuming station, etc.) is available for the autonomous vehicle. In particular embodiments, the predicted amounts of wait time for service work may be received from respective ones of the service centers. For example, the predicted amounts of wait time for service work may be received from respective client computing devices 224 of the service centers. In particular embodiments, transportation management system 110 may receive the predicted amounts of wait time for service work.

At step 615, predicted amounts of time for service work may be received. In particular embodiments, a predicted amount of time for service work may include a predicted amount of time that will transpire while the autonomous vehicle undergoes the service work to be performed. For example, a predicted amount of time for service work may include a predicted amount of time that will transpire while the autonomous vehicle undergoes charging, fueling, sensor replacement, dry vacuuming, wet vacuuming, an oil change, etc. In particular embodiments, the predicted amounts of time for service work may be received from respective ones of the service centers. For instance, the predicted amounts of time for service work may be received from respective client computing devices 224 of the service centers. In particular embodiments, transportation management system 110 may receive the predicted amounts of time for service work.

At step 620, amounts of actual wait time for service work may be received. In particular embodiments, an actual wait time for service work may include an actual amount of time that an autonomous vehicle has waited and/or sat idle, at a service center, before service work had begun. In one example, the amounts of actual wait time for service work may be received from respective ones of the service centers. For instance, the amounts of actual wait time for service work may be received from respective client computing devices 224 of the service centers. In another example, the amounts of actual wait time for service work may be received from respective autonomous vehicle computing devices 150 of respective autonomous vehicles 160. In particular embodiments, transportation management system 110 may receive the amounts of actual wait time for service work.

At step 625, actual amounts of time for service work may be received. In particular embodiments, an actual amount of time for service work may include an actual amount of time that it has taken for the service work to have been completed (e.g., a time from a start of the service work to a time of a finish of the service work). In one example, the actual amounts of time for service work may be received from respective ones of the service centers. For instance, the actual amounts of time for service work may be received from respective client computing devices 224 of respective service centers. In another example, the actual amounts of time for service work may be received from respective autonomous vehicle computing devices 150 of respective autonomous vehicles 160. In particular embodiments, transportation management system 110 may receive amounts of time for service work.

In particular embodiments, a predicted amount of time for service work and an actual amount of wait time may be zero (0). In one example, a service center may reserve one or more service personnel and/or one or more service bays/areas, such that there is no wait time. In another example, a service center may prioritize one or more service personnel and/or one or more service bays/areas, such that there is no wait time.

In particular embodiments, steps 630-640 may be performed for each service center. At step 630, predicted times may be compared with actual times. In one example, each predicted amount of wait time for service work may be compared with each actual amount of wait time for service work. For instance, each actual amount of wait time for service work may be subtracted from each respective predicted amount of wait time for service work. In another example, each predicted amount of time for service work may be compared with each actual amount of time for service work. For instance, each actual amount of time for service work may be subtracted from each respective predicted amount of time for service work.

At step 635, a score may be determined from comparisons of predicted times may be compared with actual times. In particular embodiments, the determined score may be a numerical value. For example, each comparison may be added to determine the score. In one instance, a negative score may indicate that the service center took less actual amounts of time than what the service center had predicted. In a second instance, a zero score may indicate that predicted amounts of time for the service center may be typically accurate. In another instance, a positive score may indicate that the service center took more actual amounts of time than what the service center had predicted. At step 640, the score may be outputted. In one example, outputting the score may include displaying the score. For instance, the score may be displayed via a user interface. In another example, outputting the score may include storing the score. In one instance, the score may be stored in a memory medium. In another instance, the score may be stored in a data store (e.g., service center data store 223).

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for matching autonomous vehicles with service entities including the particular steps of the method of FIG. 6, this disclosure contemplates any suitable method for matching autonomous vehicles with service entities including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
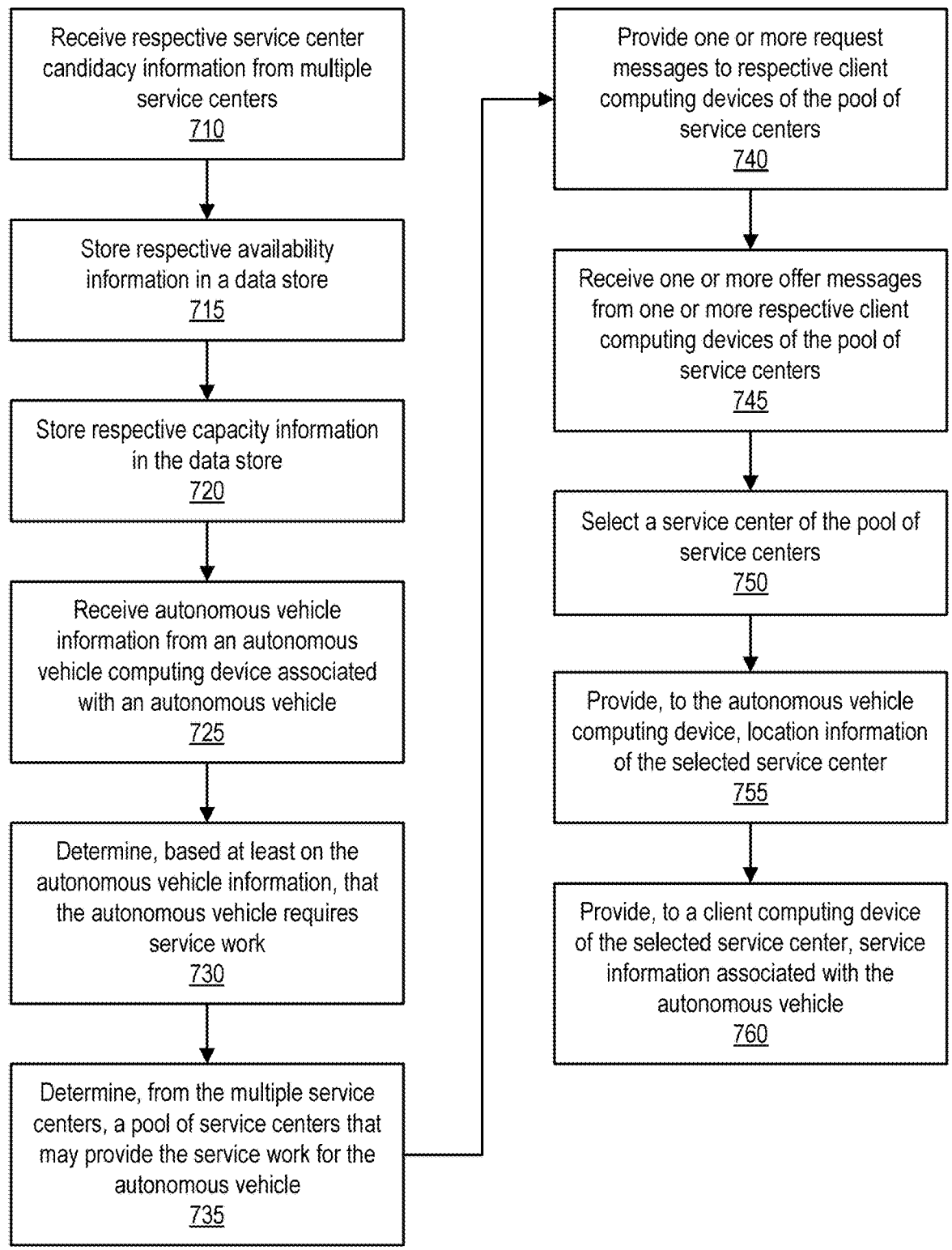
FIG. 7 illustrates an example method for operating a transportation management system, according to one or more embodiments.

Turning now to FIG. 7, an example method 700 for operating a transportation management system is illustrated, according to one or more embodiments. At step 710, respective service center candidacy information may be received from a multiple service centers. For example, transportation management system 110 may receive service center candidacy information from respective client computer devices 224 of multiple service centers. In particular embodiments, service center candidacy information of a service center may include one or more capabilities of the service center, a capacity of the service center, one or more skill sets of the service center, location information of the service center (e.g., an address of the service center, latitude and longitude coordinates, etc.), availability information (e.g., times of day, days of the week, etc.), prices for respective service work, an indication of mobility (e.g., mobile or stationary), types of cleaning services, estimated times for performing particular services, a number of charging stations, and/or types of charging stations (e.g., fast charging stations, regular charging stations, etc.), among others. In particular embodiments, UI 242 may be utilized in collecting and/or gathering one or more portions of the service center candidacy information.

At step 715, respective availability information associated with the service centers may be stored in a data store. For example, transportation management system 110 may store availability information associated with the service centers in service center data store 223. For instance, the availability information associated with the service centers may indicate one or more times types of services available, one or more times of day that one or more services are available, one or more current availabilities to perform service work, and/or one or more future availabilities to perform service work, among others.

At step 720, respective capacity information associated with the service centers may be stored in a data store. For example, transportation management system 110 may store capacity information associated with the service centers in service center data store 223. For instance, the information associated with the service centers may indicate one or more numbers of charging stations, one or more numbers of service bays, one or more numbers of mechanics on staff, one or more numbers of car washes, and/or one or more numbers of vacuuming stations, among others.

At step 725, autonomous vehicle information from an autonomous vehicle computing device associated with an autonomous vehicle may be received. For example, autonomous vehicle computing device 150 associated with autonomous vehicle 160 may provide the autonomous vehicle information. In particular embodiments, the autonomous vehicle information may include location information of autonomous vehicle 160, sensor data of autonomous vehicle 160, autonomous vehicle configuration data, sensor configuration data, and/or information associated with needed service work, among others. For example, the autonomous vehicle information may include one or more data types. For instance, different data types may be associated with respective different types of autonomous vehicles and/or different types of sensors, among others. At 730, it may be determined, based at least on the autonomous vehicle information, that the autonomous vehicle requires service work. For example, the autonomous vehicle information may indicate one or more of a sensor malfunction, a sensor failure, low tire pressure, oil pressure drop, low battery charge, and a cleaning issue, among others.

At 735, a pool of one or more service centers that may provide service work for the autonomous vehicle may be determined from the multiple service centers. In one example, determining the pool of service centers that may provide service work for the autonomous vehicle may include determining possible matches of the multiple service centers with the autonomous vehicle to determine the pool of service centers that may provide service work for the autonomous vehicle. For instance, the pool of one or more service centers may include at least one third-party service center. In a second example, determining the pool of service centers that may provide service work for the may include determining distances from each of the multiple service centers and the autonomous vehicle. For instance, each of the pool of service centers may be within a threshold distance from the autonomous vehicle. In another example, determining the pool of service centers that may provide service work for the autonomous vehicle may include determining respective scores for the multiple service centers. For instance, each score of a respective one of the pool of service centers may meet or exceed a threshold value.

In particular embodiments, the pool of service centers that may provide service work for the autonomous vehicle may include one or more third-party service centers and/or one or more service centers that are owned/operated by an owner/operator of a fleet of autonomous vehicles. For example, the owner/operator of the fleet of autonomous vehicles may utilize one or more third-party service centers from the pool of service centers. For instance, utilizing a third-party service center may reduce utilization of one or more resources (e.g., energy resources, time resources, cost resources, etc.) in servicing one or more autonomous vehicles of the fleets of autonomous vehicles. In particular embodiments, matching the autonomous vehicle with a service center may be based at least on information stored via one or more of data stores 218-223.

In particular embodiments, matching the autonomous vehicle with a service center may be based at least on one or more of a wait time for service work, a rate for the service work, a capacity for the service work, a number of service work types offered, an availability time for the service work, operator cost (e.g., labor, parts, storage, real estate, etc.), utilization of a third-party service center, transportation disruption risks, traffic patterns, road conditions, environmental factors (e.g., temperature, flooding, rain, snow, sleet, ice, etc.), a range of the autonomous vehicle, a maximum speed of the autonomous vehicle, a weather tolerance of the autonomous vehicle, a day/night functionality of the autonomous vehicle, current condition of the autonomous vehicle, a service record of a service center, a scheduled maintenance of the autonomous vehicle, a service urgency value for the service work (e.g., a location of the service center, a location of where a service center may be in the future, etc.), an inventory of one or more items for the service work, a location for the service work, predicted amounts of wait time for service work, predicted amounts of time for service work, and computed scores for respective ones of the service centers, among others. For example, determining the pool of service centers may include determining scores for the multiple service centers to determine the pool of service centers. For instance, the method described with reference to FIG. 3 may be utilized in determining scores for the multiple service centers with the autonomous vehicle to determine the pool of that may provide service work for the autonomous vehicle. In particular embodiments, a threshold value may be utilized in determine the pool of that may provide service work for the autonomous vehicle. In one example, service centers with a score above the threshold value may be included in the pool of service centers that may provide service work. In another example, service centers with a score below the threshold value may be included in the pool of service centers that may provide service work.

At 740, one or more request messages may be provided to respective one or more client computer devices 224 of the pool of service centers. For example, the one or more messages may include information indicating that the autonomous vehicle needs service work. For instance, the one or more messages may also include information indicating a compensation amount for the service work, location information associated with the autonomous vehicle, and/or a status of the autonomous vehicle (e.g., operable to drive to a service center, needs a human driver, needs a tow truck, etc.), among others.

At 745, one or more offer messages that offer to provide the service work for the autonomous vehicle from one or more client computer devices 224 of the pool of service centers may be received. At 750, a service center of the pool of service centers may be selected. In one example, a service center of the pool of service centers may be selected, based at least on the one or more messages that offer to provide the service work for the autonomous vehicle. In another example, a service center of the pool of service centers may be selected, based at least on a reduction in a utilization of at least one resource associated with the service work that will be expended.

In one instance, selecting the service center may reduce utilization of an energy resource (e.g., battery energy expended, petrol fuel energy expended, etc.) associated with an autonomous vehicle 160, as the selected service center may be closer to the autonomous vehicle than another service center and/or the selected service center may at a lower altitude than the other service center. In a second instance, selecting the service center may reduce utilization of a first time resource associated with a first amount of time to perform the service work (e.g., at least a portion of an amount of time that autonomous vehicle 160 may not be available to transport one or more users 135), as the selected service center may perform the service work faster than another service center. In a third instance, selecting the service center may reduce utilization of a second time resource associated with a second amount of travel time associated with the service work (e.g., at least a portion of an amount of time that autonomous vehicle 160 may not be available to transport one or more users 135), as a travel time to the selected service center may be less than a travel time to another service center. In a fourth instance, selecting the service center may reduce utilization of a third time resource associated with a third amount of wait time associated with waiting for service work to be performed (e.g., at least a portion of an amount of time that autonomous vehicle 160 may not be available to transport one or more users 135), as a wait time for service work to be performed at the selected service center may be less than a wait time for service work to be performed at another service center. In another instance, selecting the service center may reduce utilization of a cost resource (e.g., an amount of compensation for service work associated with autonomous vehicle 160).

In particular embodiments, resource utilization attributes may be associated with each service center of the pool of service centers. For example, the resource utilization attributes associated with a service center of the pool of service centers may include one or more of: an energy resource utilization attribute (e.g., battery energy expended, petrol fuel energy expended, etc.) associated with an autonomous vehicle 160, as autonomous vehicle 160 may be at a distance from the service center and/or autonomous vehicle 160 may be at lower or higher altitude than the service center; a first time resource utilization attribute associated with a first amount of time to perform the service work (e.g., at least a portion of an amount of time that autonomous vehicle 160 may not be available to transport one or more users 135); a second time resource utilization attribute associated with a second amount of travel time associated with the service work (e.g., at least a portion of an amount of time that autonomous vehicle 160 may not be available to transport one or more users 135); a third time resource utilization attribute associated with a third amount of wait time associated with waiting for service work to be performed (e.g., at least a portion of an amount of time that autonomous vehicle 160 may not be available to transport one or more users 135); and a cost resource utilization attribute (e.g., an amount of compensation for service work associated with autonomous vehicle 160), among others. For instance, numerical values may be respectively associated with the utilization attributes.

In particular embodiments, an optimization process may be performed utilizing the numerical values associated with the utilization attributes of each of the pool of service centers. For example, the optimization process may include one or more of a linear optimization (e.g., linear programming, etc.) and a non-linear optimization (e.g., non-linear programming, etc.), among others. For instance, the optimization process may process attributes of each of the pool of service centers to produce one or more minimum numbers or one or more maximum numbers associated with a service center of the pool of service centers. In particular embodiments, the service center associated with the one or more minimum numbers or the one or more maximum numbers may be selected to service autonomous vehicle 160. For example, the optimization process may determine a reduction of at least one resource, that will be expended, associated with the service work for autonomous vehicle 160. For instance, the one or more minimum numbers or the one or more maximum numbers may be based on one or more minimum numbers or one or more maximum numbers associated with the numerical values associated with the resource utilization attributes associated with the selected service center.

In one or more embodiments, selecting, based at least on a reduction in a utilization of at least one resource associated with the service work that will be expended, a service center from the pool of service centers may include utilizing the optimization process that may determine a reduction of at least one resource, that will be expended, associated with the service work for autonomous vehicle 160. For example, the optimization process may determine a reduction of at least one resource, that will be expended, associated with the service work for autonomous vehicle 160 and may produce one or more minimum numbers or one or more maximum numbers associated with a service center of the pool of service centers, which may indicate the service center should be selected. For instance, selecting, based at least on a reduction in a utilization of at least one resource associated with the service work that will be expended, a service center from the pool of service centers may include selecting the service center indicated by the optimization process via the one or more minimum numbers or the one or more maximum numbers.

In particular embodiments, the selected service center may be or include a third-party service center. In one example, selecting the third-party service center may reduce utilization of an energy resource, as the third-party service center may closer to the autonomous vehicle than a service center that is owned/operated by the owner/operator of the fleet of autonomous vehicles. In a second example, selecting the third-party service center may reduce utilization of a time resource, as a travel time to the third-party service center may be less than a travel time to a service center that is owned/operated by the owner/operator of the fleet of autonomous vehicles or as the third-party service center may be able to provide the service work in less time than the service center that is owned/operated by the owner/operator of the fleet of autonomous vehicles. In another example, selecting the third-party service center may reduce utilization of a cost resource, as the third-party service center may be able to provide the service work with less cost than the service center that is owned/operated by the owner/operator of the fleet of autonomous vehicles.

In particular embodiments, selecting the service center from the pool of service centers may include selecting the service center from the pool of service centers based at least on determining that a score associated with the selected service center is superior to each score associated with other service centers of the pool of service centers. In one example, the score associated with the selected service center may be superior to each score associated with other service centers of the pool of service centers such that the score associated with the selected service center may be greater than each score associated with other service centers of the pool of service centers. In another example, the score associated with the selected service center may be superior to each score associated with other service centers of the pool of service centers such that the score associated with the selected service center may be less than each score associated with other service centers of the pool of service centers.

In particular embodiments, periodic updates may be received from service centers. For example, the periodic updates may include availability to provide service work for one or more autonomous vehicles. For instance, the periodic updates may include one or more requests for types of service that may be performed. In particular embodiments, an offer for a service center to perform service work may be provided to the pool of service centers until a service center accepts the offer. For example, the offer may be provided to the pool of service centers in a sequential fashion over a period of time.

At 755, location information of the selected service center may be provided to the autonomous vehicle computing device. For example, the location information may include an address and/or coordinates. For instance, the coordinates may include latitude and longitude coordinates. In particular embodiments, it may be determined that the autonomous vehicle should not travel. For example, the location information may indicate a current location of the autonomous vehicle. For instance, a mobile service center, a human driver, or a tow truck may be dispatched to the current location of the autonomous vehicle.

At 760, service information associated with the autonomous vehicle may be provided to a computing device associated with the selected service center. For example, the service center information may be provided to a client computer devices 224 of the selected service center. In particular embodiments, the service center information may include location information associated with the autonomous vehicle, an estimated time of arrival of the autonomous vehicle, a list of service work associated with the autonomous vehicle, and/or access information and/or authorization information that may be utilized by the service center to access the autonomous vehicle, among others.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for matching autonomous vehicles with service entities including the particular steps of the method of FIG. 7, this disclosure contemplates any suitable method for matching autonomous vehicles with service entities including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
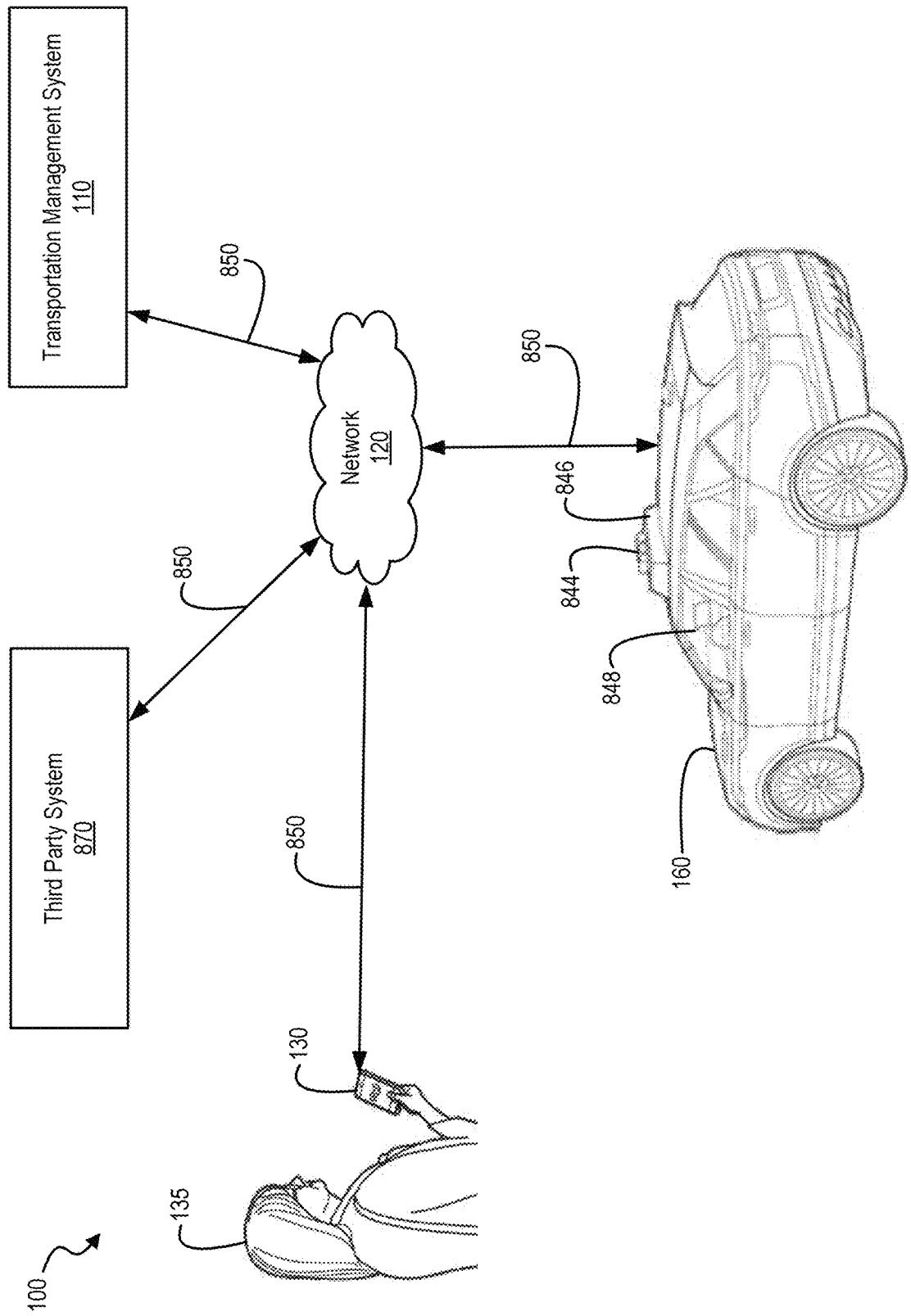
FIG. 8 illustrates another example block diagram of a transportation management environment for matching ride requestors with autonomous vehicles, according to one or more embodiments.

Turning now to FIG. 8, another example block diagram of transportation management environment 100 is illustrated, according to one or more embodiments. In particular embodiments, environment 100 may include various computing entities, such as user computing device 130 of user 135 (e.g., a ride provider or requestor), transportation management system 110, autonomous vehicle 160, and one or more third-party systems 870. The computing entities may be communicatively connected over any suitable network 120. As an example and not by way of limitation, one or more portions of network 120 may include an ad hoc network, an extranet, a VPN, a LAN, a WLAN, a WAN, a wireless WAN (WWAN), a MAN, a portion of the Internet, a portion of a PSTN, a cellular network, or a combination of any of the above. In particular embodiments, any suitable network arrangement and protocol enabling the computing entities to communicate with each other may be used. Although FIG. 8 illustrates a single user device 130, a single transportation management system 110, a single autonomous vehicle 160, a single third-party system 870, and a single network 120, this disclosure contemplates any suitable number of each of these entities. As an example and not by way of limitation, environment 100 may include multiple users 135, user devices 130, multiple transportation management systems 110, multiple autonomous vehicles 160, multiple third-party systems 870, and/or multiple networks 120, among others.

User device 130, transportation management system 110, autonomous vehicle 160, and third-party system 870 may be communicatively connected or co-located with each other in whole or in part. These computing entities may communicate via different transmission technologies and network types. For example, user device 130 and autonomous vehicle 160 may communicate with each other via a cable or short-range wireless communication (e.g., Bluetooth, NFC, WI-FI, etc.), and together they may be connected to the Internet via a cellular network accessible to either one of the devices (e.g., user device 130 may be a smartphone with LTE connection). Transportation management system 110 and third-party system 870, on the other hand, may be connected to the Internet via their respective LAN/WLAN networks and Internet Service Providers (ISP). FIG. 8 illustrates transmission links 850 that connect user device 130, autonomous vehicle 160, transportation management system 110, and third-party system 870 to communication network 120. This disclosure contemplates any suitable transmission links 850, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 850 may connect to one or more networks 120, which may include in part, e.g., ad hoc network, the Intranet, extranet, VPN, LAN, WLAN, WAN, WWAN, MAN, PSTN, a cellular network, a satellite network, or any combination thereof. The computing entities need not necessarily use the same type of transmission link 850. For example, user device 130 may communicate with transportation management system 110 via a cellular network and the Internet, but communicate with autonomous vehicle 160 via Bluetooth or a physical wire connection.

In particular embodiments, transportation management system 110 may fulfill ride requests for one or more users 135 by dispatching suitable vehicles. Transportation management system 110 may receive any number of ride requests from any number of ride requestors 135. In particular embodiments, a ride request from a ride requestor 135 may include an identifier that identifies him/her in transportation management system 110. Transportation management system 110 may use the identifier to access and store the ride requestor's 135 information, in accordance with his/her privacy settings. Ride requestor's 135 information may be stored in one or more data stores (e.g., a relational database system) associated with and accessible to transportation management system 110. In particular embodiments, ride requestor information may include profile information about a particular ride requestor 135. In particular embodiments, ride requestor 135 may be associated with one or more categories or types, through which the ride requestor 135 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, transportation management system 110 may classify a user 135 based on known information about the user 135 (e.g., using machine-learning classifiers), and use the classification to retrieve relevant aggregate information associated with that class. For example, the system 110 may classify a user 135 as a teenager and retrieve relevant aggregate information associated with teenagers, such as the type of music generally preferred by teenagers.

Transportation management system 110 may also store and access ride information. Ride information may include locations related to the ride, traffic data, route options, optimal pick-up or drop-off locations for the ride, or any other suitable information associated with a ride. As an example and not by way of limitation, when transportation management system 110 receives a request to travel from San Francisco International Airport (SFO) to Palo Alto, Calif., transportation management system 110 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by transportation management system 110. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of transportation management system 110. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to news, etc. As yet another example, historical data associated with all users may include general usage trends, such as traffic and ride patterns. Using historical data, transportation management system 110 in particular embodiments may predict and provide ride suggestions in response to a ride request. In particular embodiments, transportation management system 110 may use machine-learning, such as neural-networks, regression processes, instance-based processes (e.g., k-Nearest Neighbor), decision-tree processes, Bayesian processes, clustering processes, association-rule-learning processes, deep-learning processes, dimensionality-reduction processes, ensemble processes, and any other suitable machine-learning processes known to persons of ordinary skill in the art. The machine-learning models may be trained using any suitable training process, including supervised learning based on labeled training data, unsupervised learning based on unlabeled training data, and/or semi-supervised learning based on a mixture of labeled and unlabeled training data.

In particular embodiments, transportation management system 110 may include one or more servers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 110 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or other suitable database system. Although this disclosure describes or illustrates particular types of databases, this disclosure contemplates any suitable types of databases. Particular embodiments may provide interfaces that enable a user device 130 (which may belong to a ride requestor or provider), a transportation management system 110, vehicle system 160, or a third-party system 870 to process, transform, manage, retrieve, modify, add, or delete the information stored in data store.

In particular embodiments, transportation management system 110 may include an authorization server (or other suitable component(s)) that allows users 135 to opt-in to or opt-out of having their information and actions logged, recorded, or sensed by transportation management system 110 or shared with other systems (e.g., third-party systems 870). In particular embodiments, a user 135 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 135 of transportation management system 110 through blocking, data hashing, anonymization, or other suitable techniques as appropriate.

In particular embodiments, third-party system 870 may be a network-addressable computing system that may host GPS maps, customer reviews, music or content, weather information, or any other suitable type of information. Third-party system 870 may generate, store, receive, and send relevant data, such as, for example, map data, customer review data from a customer review website, weather data, or any other suitable type of data. Third-party system 870 may be accessed by the other computing entities of the network environment either directly or via network 120. For example, user device 130 may access third-party system 870 via network 120, or via transportation management system 110. In the latter case, if credentials are required to access third-party system 870, user 135 may provide such information to the transportation management system 110, which may serve as a proxy for accessing content from third-party system 870.

In particular embodiments, user device 130 may be a mobile computing device such as a smartphone, tablet computer, or laptop computer. User device 130 may include one or more processors (e.g., CPU and/or GPU), memory, and storage. An operation system and applications may be installed on user device 130, such as, e.g., a transportation application associated with the transportation management system 110, applications associated with third-party systems 870, and applications associated with the operating system. User device 130 may include functionality for determining its location, direction, or orientation, based on integrated sensors such as GPS, compass, gyroscope, or accelerometer. User device 130 may also include wireless transceivers for wireless communication, and may support wireless communication protocols such as Bluetooth, near-field communication (NFC), infrared (IR) communication, WI-FI, and/or 2G/3G/4G/LTE mobile communication standard. User device 130 may also include one or more cameras, scanners, touchscreens, microphones, speakers, and any other suitable input-output devices.

In particular embodiments, autonomous vehicle 160 may be an autonomous vehicle and equipped with an array of sensors 844, a navigation system 846, and a ride-service computing device 848. In particular embodiments, a fleet of autonomous vehicles 160 may be managed by transportation management system 110. The fleet of autonomous vehicles 160, in whole or in part, may be owned by the entity associated with transportation management system 110, or they may be owned by a third-party entity relative to transportation management system 110. In either case, transportation management system 110 may control the operations of autonomous vehicles 160, including, e.g., dispatching select autonomous vehicle 160 to fulfill ride requests, instructing autonomous vehicles 160 to perform select operations (e.g., head to a service center or charging/fueling station, pull over, stop immediately, self-diagnose, lock/unlock compartments, change music station, change temperature, and any other suitable operations), and instructing autonomous vehicles 160 to enter select operation modes (e.g., operate normally, drive at a reduced speed, drive under the command of human operators, and any other suitable operational modes).

In particular embodiments, autonomous vehicles 160 may receive data from and transmit data to transportation management system 110 and third-party system 870. Example of received data may include, e.g., instructions, new software or software updates, maps, three-dimensional (3D) models, trained or untrained machine-learning models, location information (e.g., location of the ride requestor, autonomous vehicle 160 itself, other autonomous vehicles 160, and target destinations such as service centers), navigation information, traffic information, weather information, entertainment content (e.g., music, video, and news) ride requestor information, ride information, and any other suitable information. Examples of data transmitted from the autonomous vehicle 160 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in autonomous vehicle 160, passengers may send/receive data to transportation management system 110 and/or third-party system 870), and any other suitable data.

In particular embodiments, autonomous vehicles 160 may also communicate with each other as well as other traditional human-driven vehicles, including those managed and not managed by the transportation management system 110. For example, one autonomous vehicle 160 may communicate with another autonomous vehicle 160 data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via transportation management system 110 or third-party system 870).

In particular embodiments, an autonomous vehicle 160 may obtain and process sensor/telemetry data. Such data may be captured by any suitable sensors. For example, autonomous vehicle 160 may have a Light Detection and Ranging (LiDAR) sensor array of multiple LiDAR transceivers that are configured to rotate 360°, emitting pulsed laser light and measuring the reflected light from objects surrounding vehicle 160. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a 3D model of the external environment of autonomous vehicle 160. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 160 may have optical cameras pointing in different directions. The cameras may be used for, e.g., recognizing roads, lane markings, street signs, traffic lights, police, other vehicles, and any other visible objects of interest. To enable vehicle 160 to "see" at night, infrared cameras may be installed. In particular embodiments, the vehicle may be equipped with stereo vision for, e.g., spotting hazards such as pedestrians or tree branches on the road. As another example, autonomous vehicle 160 may have radars for, e.g., detecting other vehicles and/or hazards afar. Furthermore, the vehicle 160 may have ultra sound equipment for, e.g., parking and obstacle detection. In addition to sensors enabling autonomous vehicle 160 to detect, measure, and understand the external world around it, autonomous vehicle 160 may further be equipped with sensors for detecting and self-diagnosing its own state and condition. For example, autonomous vehicle 160 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieving using any combination of sensors. For example, an autonomous vehicle 160 may build a 3D model of its surrounding based on data from its LiDAR, radar, sonar, and cameras, along with a pre-generated map obtained from transportation management system 110 or third-party system 870. Although sensors 844 appear in a particular location on autonomous vehicle 160 in FIG. 8, sensors 844 may be located in any suitable location in and/or on autonomous vehicle 160. Example locations for sensors include the front and rear bumpers, the doors, the front windshield, on the side paneling, or any other suitable location.

In particular embodiments, autonomous vehicle 160 may be equipped with a processing unit (e.g., one or more CPUs and GPUs), memory, and storage. Autonomous vehicle 160 may thus be equipped to perform a variety of computational and processing tasks, including processing the sensor data, extracting useful information, and operating accordingly. For example, based on images captured by its cameras and a machine-vision model, autonomous vehicle 160 may identify particular types of objects captured by the images, such as pedestrians, other vehicles, lanes, curbs, and any other objects of interest.

In particular embodiments, autonomous vehicle 160 may have a navigation system 846 responsible for safely navigating autonomous vehicle 160. In particular embodiments, navigation system 846 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. Navigation system 846 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 846 may use its determinations to control autonomous vehicle 160 to operate in prescribed manners and to guide autonomous vehicle 160 to its destinations without colliding into other objects. Although the physical embodiment of the navigation system 846 (e.g., the processing unit) appears in a particular location on autonomous vehicle 160 in FIG. 8, navigation system 846 may be located in any suitable location in or on autonomous vehicle 160. Example locations for navigation system 846 include inside the cabin or passenger compartment of autonomous vehicle 160, near the engine/battery, near the front seats, rear seats, or in any other suitable location.

In particular embodiments, autonomous vehicle 160 may be equipped with a ride-service computing device 848, which may be a tablet or other suitable device installed by transportation management system 110 to allow the user to interact with the autonomous vehicle 160, transportation management system 110, other users 135, or third-party systems 870. In particular embodiments, installation of ride-service computing device 848 may be accomplished by placing ride-service computing device 848 inside autonomous vehicle 160, and configuring it to communicate with the vehicle 160 via a wire or wireless connection (e.g., via Bluetooth). Although FIG. 8 illustrates a single ride-service computing device 848 at a particular location in autonomous vehicle 160, autonomous vehicle 160 may include several ride-service computing devices 848 in several different locations within autonomous vehicle 160. As an example and not by way of limitation, autonomous vehicle 160 may include four ride-service computing devices 848 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 848 may be detachable from any component of autonomous vehicle 160. This may allow users to handle ride-service computing device 848 in a manner consistent with other tablet computing devices. As an example and not by way of limitation, a user may move ride-service computing device 848 to any location in the cabin or passenger compartment of autonomous vehicle 160, may hold ride-service computing device 848 in his/her lap, or handle ride-service computing device 848 in any other suitable manner. In particular embodiments, ride-service computing device 848 may include one or more structures and/or one or more functionalities as those described with reference to autonomous vehicle computing device 150. Although this disclosure describes providing a particular computing device in a particular manner, this disclosure contemplates providing any suitable computing device in any suitable manner.

Figure 9:
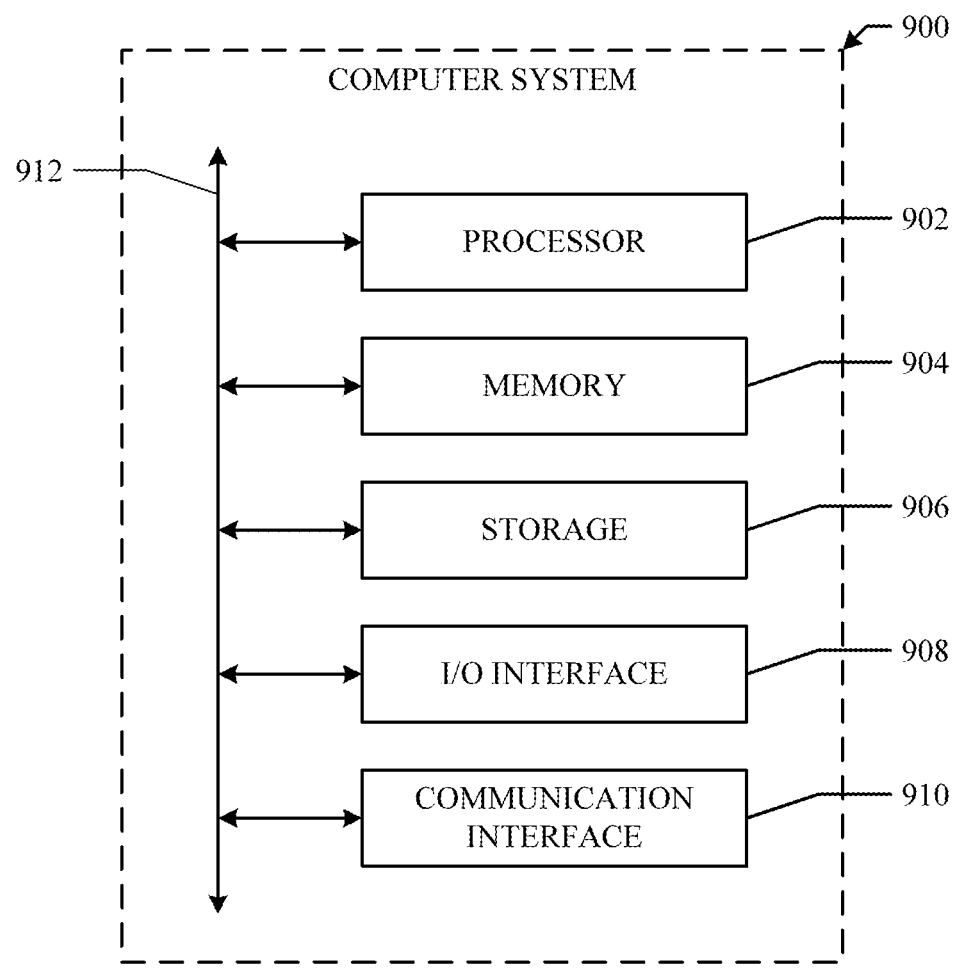
FIG. 9 illustrates an example of a computing system, according to one or more embodiments.

Turning now to FIG. 9, an example computer system 900 is illustrated, according to one or more embodiments. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described in further detail below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, processor 902 may execute processor instructions in implementing one or more systems, one or more flowcharts, one or more methods, and/or one or more processes described herein. In one example, memory 904 may store processor instructions and/or software, executable by processor 902, that may be utilized in implementing one or more systems, one or more flowcharts, one or more methods, and/or one or more processes described herein. In a second example, storage 906 may store processor instructions and/or software, executable by processor 902, that may be utilized in implementing one or more systems, one or more flowcharts, one or more methods, and/or one or more processes described herein. In another, processor 902 may execute instructions received via communication interface 910 that may be utilized in implementing one or more systems, one or more flowcharts, one or more methods, and/or one or more processes described herein. In particular embodiments, one or more FPGAs and/or one or more ASICs may be configure to implement one or more systems, one or more flowcharts, one or more methods, and/or one or more processes described herein Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
   one or more processors; and
   one or more computer-readable non-transitory storage media coupled to one or more of the processors, the one or more computer-readable non-transitory storage media comprising instructions operable when executed by one or more of the processors to cause the system to perform operations comprising:

receiving respective service center candidacy information from a plurality of service center computers;

receiving autonomous vehicle information from an autonomous vehicle computing device associated with an autonomous vehicle;

determining, based at least on the autonomous vehicle information, that the autonomous vehicle requires service work;

determining, based on the candidacy information from the plurality of service center computers and the autonomous vehicle information, a pool of service centers that are capable of providing the service work for the autonomous vehicle;

selecting, based at least on a reduction in a utilization of at least one resource associated with the service work that will be expended, a service center from the pool of service centers; and providing, to the autonomous vehicle computing device associated with the autonomous vehicle, location information of the selected service center.

2. The system of claim 1, wherein the selecting, based at least on the reduction in the utilization of the at least one resource associated with the service work that will be expended, the service center from the pool of service centers includes utilizing an optimization process that determines the reduction of the at least one resource via processing numerical values associated with resource utilization attributes associated with each service center of the pool of service centers.

3. The system of claim 2, wherein the at least one resource includes at least one of an energy resource associated with the autonomous vehicle, a first time resource associated with a first amount of time to perform the service work, a second time resource associated with a second amount of travel time associated with the service work, and a third time resource associated with a third amount of wait time associated with waiting for the service work to be performed.

4. The system of claim 1, wherein the determining the pool of service centers includes determining possible matches of the plurality of service centers with the autonomous vehicle.

5. The system of claim 4, wherein the determining the possible matches of the plurality of service centers with the autonomous vehicle is based at least on one or more of: a wait time for the service work, a rate for the service work, a capacity for the service work, a number of service work types offered, an availability time for the service work, an operator cost, transportation disruption risks, traffic patterns, road conditions, environmental factors, a range of the autonomous vehicle, a maximum speed of the autonomous vehicle, a weather tolerance of the autonomous vehicle, current condition of the autonomous vehicle, a service record of the service center, a scheduled maintenance of the autonomous vehicle, a service urgency value for the service work, an inventory of one or more items for the service work, a location for the service work, predicted amounts of wait time for service work, and predicted amounts of time for service work.

6. The system of claim 4,
wherein the determining the pool of service centers includes determining respective scores for the plurality of service centers and determining that the score for each of the pool of service centers meets or exceeds a threshold value; and wherein the determining the respective scores for the plurality of service centers includes weighting a plurality of attributes associated with each of the plurality of service centers.

7. The system of claim 6,
wherein the determining respective scores for the plurality of service centers includes determining a numerical value for each plurality of attributes associated with each of the plurality of service centers; and
wherein the selecting the service center from the pool of service centers includes selecting the service center from the pool of service centers based at least on determining that a score associated with the selected service center is superior to each score associated with other service centers of the pool of service centers.

8. The system of claim 3, wherein the processors are further operable when executing the instructions to perform operations comprising:
receiving predicted amounts of wait time for service work, actual amounts of wait time for service work, predicted amounts of time for service work, and actual amounts of time for service work; and
determining respective scores for the plurality of service centers based at least on the predicted amounts of wait time for service work, the actual amounts of wait time for service work, the predicted amounts of time for service work, and the actual amounts of time for service work;
wherein the determining the possible matches of the plurality of service centers with the autonomous vehicle is based at least on the respective scores of the plurality of service centers.

9. The system of claim 1, wherein the determining the pool of service centers includes determining a distance between each of the plurality of service centers to the autonomous vehicle, wherein the distance between each of the pool of service centers to the autonomous vehicle is within a threshold distance.

10. The system of claim 1, wherein the processors are further operable when executing the instructions to perform operations comprising:
providing, to a computing device associated with the selected service center, service information associated with the autonomous vehicle.

11. A method comprising, by a computing system:
receiving respective service center candidacy information from a plurality of service center computers;
receiving autonomous vehicle information from an autonomous vehicle computing device associated with an autonomous vehicle;
determining, based at least on the autonomous vehicle information, that the autonomous vehicle requires service work;
determining, based on the candidacy information from the plurality of service center computers and the autonomous vehicle information, a pool of service centers that are capable of providing the service work for the autonomous vehicle;
selecting, based at least on a reduction in a utilization of at least one resource, a service center from the pool of service centers; and
providing, to the autonomous vehicle computing device associated with the autonomous vehicle, location information of the selected service center.

12. The method of claim 11, wherein the selecting, based at least on the reduction in the utilization of the at least one resource associated with the service work that will be expended, the service center from the pool of service centers includes utilizing an optimization process that determines the reduction of the at least one resource via processing numerical values associated with resource utilization attributes associated with each service center of the pool of service centers.

13. The method of claim 12, wherein the at least one resource includes at least one of an energy resource associated with the autonomous vehicle, a first time resource associated with a first amount of time to perform the service work, a second time resource associated with a second amount of travel time associated with the service work, and a third time resource associated with a third amount of wait time associated with waiting for the service work to be performed.

14. The method of claim 11, wherein the determining the pool of service centers includes determining possible matches of the plurality of service centers with the autonomous vehicle.

15. The method of claim 14, wherein the determining the possible matches of the plurality of service centers with the autonomous vehicle is based at least on one or more of: a wait time for the service work, a rate for the service work, a capacity for the service work, a number of service work types offered, an availability time for the service work, an operator cost, transportation disruption risks, traffic patterns, road conditions, environmental factors, a range of the autonomous vehicle, a maximum speed of the autonomous vehicle, a weather tolerance of the autonomous vehicle, current condition of the autonomous vehicle, a service record of the service center, a scheduled maintenance of the autonomous vehicle, a service urgency value for the service work, an inventory of one or more items for the service work, a location for the service work, predicted amounts of wait time for service work, and predicted amounts of time for service work.

16. The method of claim 14, further comprising:
receiving predicted amounts of wait time for service work, actual amounts of wait time for service work, predicted amounts of time for service work, and actual amounts of time for service work; and
determining respective scores for the plurality of service centers based at least on the predicted amounts of wait time for service work, the actual amounts of wait time for service work, the predicted amounts of time for service work, and the actual amounts of time for service work;
wherein the determining the possible matches of the plurality of service centers with the autonomous vehicle is based at least on the respective scores of the plurality of service centers.

17. The method of claim 14,
wherein the determining the pool of service centers includes determining respective scores for the plurality of service centers and determining that the score for each of the pool of service centers meets or exceeds a threshold value;
wherein the determining the respective scores for the plurality of service centers includes weighting a plurality of attributes associated with each of the plurality of service centers;
wherein the determining respective scores for the plurality of service centers includes determining a numerical value for each plurality of attributes associated with each of the plurality of service centers; and
wherein the selecting the service center from the pool of service centers includes selecting the service center from the pool of service centers based at least on determining that a score associated with the selected service center is superior to each score associated with other service centers of the pool of service centers.

18. One or more computer-readable non-transitory storage media embodying software that is operable when executed to cause one or more processors to perform operations comprising:
receiving respective service center candidacy information from a plurality of service center computers;
receiving autonomous vehicle information from an autonomous vehicle computing device associated with an autonomous vehicle;
determining, based at least on the autonomous vehicle information, that the autonomous vehicle requires service work;
determining, based on the candidacy information from the plurality of service center computers and the autonomous vehicle information, a pool of service centers that are capable of providing the service work for the autonomous vehicle;
selecting, based at least on a reduction in a utilization of at least one resource, a service center from the pool of service centers; and
providing, to the autonomous vehicle computing device associated with the autonomous vehicle, location information of the selected service center.

19. The media of claim 18, wherein the selecting, based at least on the reduction in the utilization of the at least one resource associated with the service work that will be expended, the service center from the pool of service centers includes utilizing an optimization process that determines the reduction of the at least one resource via processing numerical values associated with resource utilization attributes associated with each service center of the pool of service centers.

20. The media of claim 19, wherein the at least one resource includes at least one of an energy resource associated with the autonomous vehicle, a first time resource associated with a first amount of time to perform the service work, a second time resource associated with a second amount of travel time associated with the service work, and a third time resource associated with a third amount of wait time associated with waiting for the service work to be performed.

* * * * *